US009619417B2

(12) United States Patent
Hari et al.

(10) Patent No.: US 9,619,417 B2
(45) Date of Patent: Apr. 11, 2017

(54) METHOD AND APPARATUS FOR REMOTE DELIVERY OF MANAGED USB SERVICES VIA A MOBILE COMPUTING DEVICE

(75) Inventors: Adiseshu Hari, Holmdel, NJ (US); Andrea Francini, Mooresville, NC (US); Yuh-Jye Chang, Bridgewater, NJ (US); Manoj K. Jaitly, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 675 days.

(21) Appl. No.: 13/162,877

(22) Filed: Jun. 17, 2011

(65) Prior Publication Data
US 2012/0324067 A1    Dec. 20, 2012

(51) Int. Cl.
*G06F 9/44* (2006.01)
*G06F 13/38* (2006.01)
(Continued)

(52) U.S. Cl.
CPC .............. *G06F 13/385* (2013.01); *G06F 8/38* (2013.01); *H04M 1/72525* (2013.01);
(Continued)

(58) Field of Classification Search
CPC ......... G06F 8/38; G06F 13/385; H04L 67/16; H04L 67/04; H04L 45/60; H04L 61/2521; H04M 1/72525
(Continued)

(56) References Cited

U.S. PATENT DOCUMENTS

2007/0016714 A1\* 1/2007 Huotari et al. ................ 710/313
2008/0113655 A1\* 5/2008 Angelhag ................. 455/414.2
(Continued)

FOREIGN PATENT DOCUMENTS

CN          1677378 A     10/2005
CN        101127743 A      2/2008
(Continued)

OTHER PUBLICATIONS

The International Search Report and The Written Opinion of the International Searching Authority, or the Declaration, in PCT/US2012/039020, Alcatel-Lucent USA Inc., Applicant,12 pages.

*Primary Examiner* — Kyung H Shin
(74) *Attorney, Agent, or Firm* — Tong, Rea, Bentley & Kim, LLC

(57) ABSTRACT

A managed Universal Serial Bus (USB) service capability is disclosed. The managed USB service capability is configured to use a mobile computing device (e.g., a smartphone or other suitable mobile computing device) to support a set of services for a computer (e.g., a desktop, a laptop, and the like) capable of connecting to the mobile computing device via a USB connection. The managed USB service capability enables local and/or remote control of the mobile computing device to operate in various USB device classes, such that the mobile computing device can provide various managed USB services for the computer via the peripheral connection. In this manner, the mobile computing device may be dynamically configured to operate as one or more of a network interface, a virtual private network (VPN) client, a smart card, a serial console, a mass-storage device, a booting device, and the like.

34 Claims, 5 Drawing Sheets

(51) Int. Cl.
  *H04M 1/725* (2006.01)
  *H04L 29/08* (2006.01)
  *H04L 29/12* (2006.01)
  *H04L 12/773* (2013.01)

(52) U.S. Cl.
  CPC .......... *H04L 45/60* (2013.01); *H04L 61/2521* (2013.01); *H04L 67/04* (2013.01); *H04L 67/16* (2013.01)

(58) Field of Classification Search
  USPC .................. 709/222; 717/168; 370/328, 389; 710/313; 713/2
  See application file for complete search history.

(56) References Cited

U.S. PATENT DOCUMENTS

| | | | |
|---|---|---|---|
| 2009/0013165 A1* | 1/2009 | Chow et al. | 713/2 |
| 2009/0307679 A1* | 12/2009 | Lee et al. | 717/168 |
| 2010/0014459 A1* | 1/2010 | Mir et al. | 370/328 |
| 2010/0146279 A1* | 6/2010 | Lu et al. | 713/172 |

FOREIGN PATENT DOCUMENTS

| | | |
|---|---|---|
| EP | 1 710 956 A1 | 10/2006 |
| JP | 2006024155 A | 1/2006 |
| JP | 2009110482 A | 5/2009 |
| JP | 2010039616 A | 2/2010 |

\* cited by examiner

METHOD AND APPARATUS FOR REMOTE DELIVERY OF MANAGED USB SERVICES VIA A MOBILE COMPUTING DEVICE

TECHNICAL FIELD

The invention relates generally to communication networks and, more specifically but not exclusively, to supporting services for a computer via a mobile computing device.

BACKGROUND

Computers (e.g., desktops, laptops, tablets, and the like) are standard equipment for a large portion of the present-day workforce. Computers, while greatly enhancing productivity, also come with a heavy maintenance burden, because their installed software and hardware components can suffer myriad failures. For example, computer software may encounter issues such as program malfunctions, virus infections, and the like. Similarly, for example, computer hardware may encounter hard-disk corruption, boot-up issues, and the like. In nearly all cases where the computer has maintenance issues, it is vital for the employee to have the computer serviced as soon as possible, to avoid losses in productivity, enterprise security breaches, and various other problems that may result from such situations. However, such maintenance operations take time for nearly all employees, and especially for remote employees who may not have convenient access to a corporate service center. Furthermore, for traveling employees, network connectivity may be sporadic and laptop thefts are not unusual, additional issues that negatively impact employee productivity and enterprise security. Moreover, many of these same issues also are encountered in various other environments (e.g., consumer environments and the like), where computers may suffer various hardware and/or software problems, may come under attack, and may be lost or stolen.

SUMMARY

In one embodiment, an apparatus includes a processor and a memory, where the processor configured to receive, at a mobile computing device via a remote data connection between the mobile computing device and a remote device, a request to configure the mobile computing device to operate in a selected one of a plurality of peripheral connection device classes, and initiate configuration of the mobile computing device to operate in the selected peripheral connection device class. In one embodiment, a method includes using a processor for receiving, at a mobile computing device via a remote data connection between the mobile computing device and a remote device, a request to configure the mobile computing device to operate in a selected one of a plurality of peripheral connection device classes, and initiating configuration of the mobile computing device to operate in the selected peripheral connection device class. In one embodiment, a computer readable storage medium stores instructions which, when executed by a processor, cause the processor to perform such a method.

In one embodiment, an apparatus includes a processor and a memory, where the processor configured to receive, at a mobile computing device via a remote data connection between the mobile computing device and a remote device, a message associated with a service to be provided for a computer via the mobile computing device, and initiate an action for providing the service for the computer via the mobile computing device. In one embodiment, a method includes using a processor for receiving, at a mobile computing device via a remote data connection between the mobile computing device and a remote device, a message associated with a service to be provided for a computer via the mobile computing device, and initiating an action for providing the service for the computer via the mobile computing device. In one embodiment, a computer readable storage medium stores instructions which, when executed by a processor, cause the processor to perform such a method.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION OF ILLUSTRATIVE EMBODIMENTS

Figure 1:
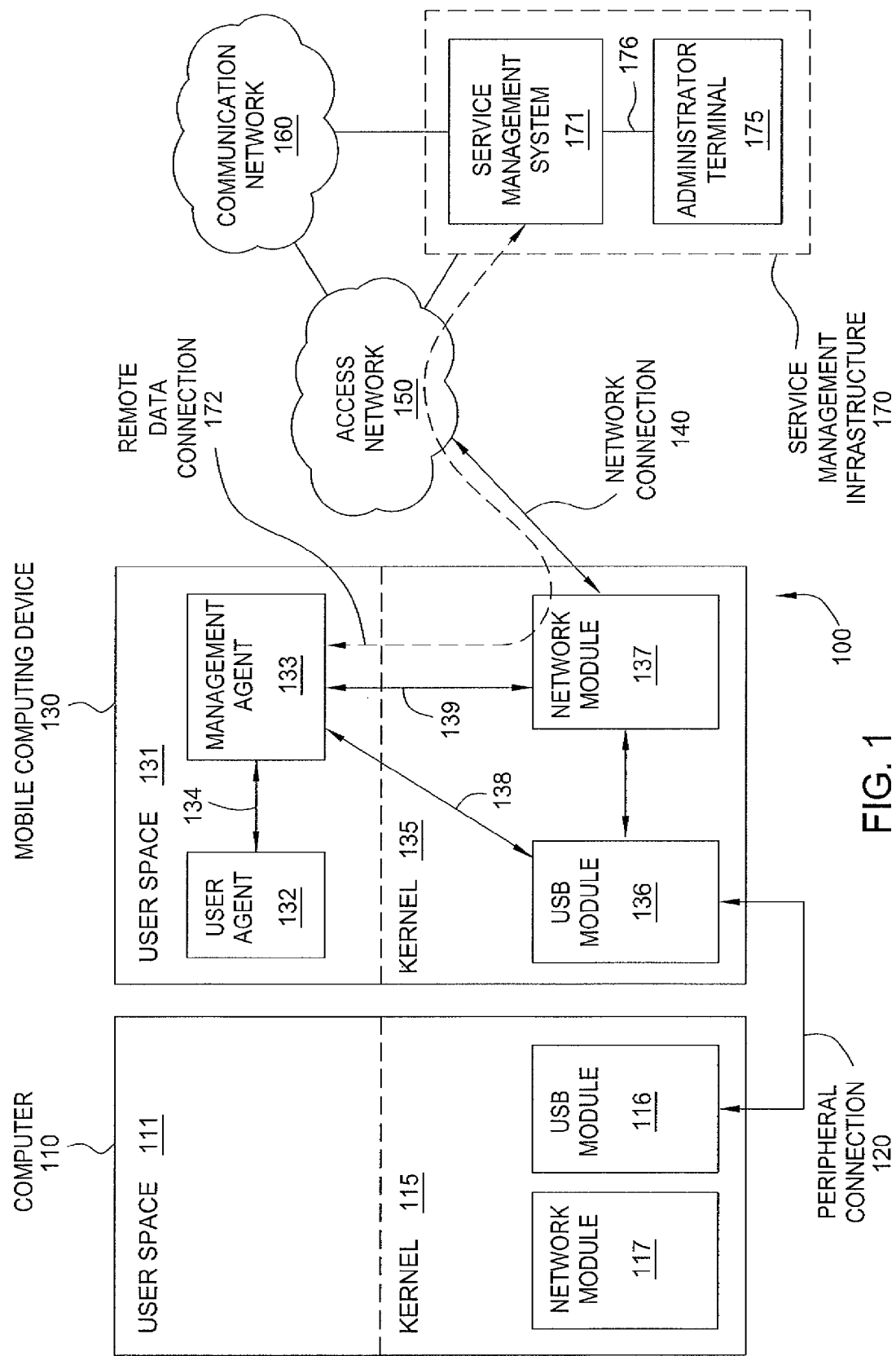
FIG. 1 depicts an exemplary embodiment of a system configured to enable a mobile computing device to support managed USB services for a computer.

In general, a managed USB service capability is depicted and described herein, although various other capabilities also may be presented herein.

In at least some embodiments, the managed USB service capability is configured to use a mobile computing device (e.g., a smartphone or other suitable mobile computing device) to support a set of services for a computer (e.g., a desktop, a laptop, and the like) capable of connecting to the mobile computing device via a Universal Serial Bus (USB) connection.

In at least some embodiments, the managed USB service capability enables local and/or remote control of the mobile computing device to operate in various USB device classes, such that the mobile computing device can provide various managed USB services for the computer via the peripheral connection. For example, various embodiments of the managed USB service capability may enable operation of the mobile computing device in one or more of the USB device classes (e.g., the USB Ethernet class, the USB Communications Device Class (CDC) Abstract Control Model (ACM) class, the USB Mass Storage class, and the like), such that the mobile computing device may be dynamically configured to operate as one or more of a network interface, a virtual private network (VPN) client, a smart card, a serial console, a mass-storage device, a booting device, and the like.

In at least some embodiments, the managed USB service capability enables local and/or remote control of the mobile computing device to provide various managed USB services for the computer via the peripheral connection. For example, various embodiments of the managed USB service capability may support managed USB services including a Managed USB Internet Tethering Service, a Managed USB VPN Tethering Service, a Managed USB Smart Card Service, a Managed USB Serial Console Service, a Managed USB Mass Storage Service, a Managed USB Booting Service, and the like.

As described herein, control of the mobile computing device may be provided locally (e.g., via a user interface of the mobile computing device and/or any other suitable interface available on or near the mobile computing device) and/or remotely (e.g., via one or more data connections of the mobile computing device, such as via a wired network connection, a wireless local area network (WLAN) connection, a wireless wide area network (WWAN) connection, and the like). This may enable local and/or remote control of the mobile computing device for one or more of controlling the mobile computing device to operate in various USB device classes, controlling the mobile computing device to provide various managed USB services for the computer via the peripheral connection, and the like.

In this manner, at least some of the embodiments of the managed USB service capability enable use of a mobile computing device to extend the range of operating and management conditions under which computer operation and management actions may be performed for a computer capable of connecting to the mobile computing device via a peripheral connection.

It is noted that various embodiments of the managed USB service capability may be provided within various applications, such as within enterprise applications (e.g., for improving enterprise network access for enterprise employees, for improving enterprise IT management capabilities, and the like, as well as various combinations thereof), within consumer applications (e.g., providing a foundation for a large set of services which may be managed by entities such as communications service providers, third-party service providers, and so forth), and the like.

Although primarily depicted and described herein with respect to embodiments of the managed USB service capability in which a particular type of mobile computing device (e.g., a smartphone) is used to provide managed USB services for a particular type of computer (e.g., an end-user computer) via a particular type of peripheral connection (e.g., a USB cable) in a particular type of application (e.g., in an enterprise environment), it is noted that various embodiments of the managed USB service capability may be used in conjunction with various other types of mobile computing devices used to provide managed USB services, various other types of computers and other devices for which managed USB services are provided, various other types of peripheral connections which may be used to provide managed USB services, and/or various other types of applications within which managed USB services may be provided/used.

FIG. 1 depicts an exemplary embodiment of a system configured to enable a mobile computing device to support managed USB services for a computer.

As depicted in FIG. 1, system 100 includes a computer 110, a peripheral connection 120, a mobile computing device 130, a network connection 140, an access network 150, a communication network 160, and a service management infrastructure 170.

In general, the computer 110 represents any type of device supporting one or more USB device classes and one or more peripheral interfaces (e.g., for supporting peripheral connection 120) for communication with one or more devices operating in the one or more USB device classes. It will be appreciated that computer 110 includes a processor and memory, and may include various types of hardware and software for performing functions on the computer 110. It is noted that computer 110 also may include one or more network interfaces for accessing one or more types of communication networks (e.g., one or more of wired interface, a LWAN interface, a WWAN interface, and the like, as well as various combinations thereof). For example, the computer 110 may be a user computer (e.g., a desktop computer, a laptop computer, a notebook computer, a tablet computer, and the like), a network computer (e.g., a router, a switch, and the like), or any other suitable type of device. The typical design and operation of such computers will be understood by one skilled in the art.

As depicted in FIG. 1, the computer 110 includes a user space 111 and a kernel 112. The user space 111 is configured to support user interaction via computer 110, and may include one or more applications which may be used by users of computer 110. The kernel 115 is configured to interface the user space 111 to hardware of computer 110 (e.g., CPUs, memory, other devices, and the like, which have been omitted from FIG. 1 for purposes of clarity). As depicted in FIG. 1, the kernel 115 includes a USB module 116 and a network module 117.

The USB module 116 provides an external interface via peripheral interface 120, via which various peripheral devices may connect to computer 110. The USB module 116 includes various modules (omitted from FIG. 1 for purposes of clarity, but depicted and described in detail in FIG. 2) configured to enable computer 110 to support multiple USB device classes of various types of peripheral devices which may connect to computer 110 via peripheral interface 120 (illustratively, mobile computing device 130). The typical design and operation of such a USB module will be understood by one skilled in the art.

The network module 117 provides one or more external interfaces via which the computer 110 may communicate with one or more types of access networks. For example, although omitted for purposes of clarity, it will be appreciated that network module 117 supports TCP/IP communications, and includes one or more network interface cards (NICs) configured to support communications with one or more types of communications networks. For example, the NIC(s) of computer 110 may include one or more of an Ethernet NIC for Ethernet-based communication, a Wireless Fidelity (WiFi) NIC for communication with WiFi networks, a cellular NIC for cellular communication with one or more types of cellular networks (e.g., 2.5G cellular network, a 3G cellular network, a 4G cellular network, and the like), a Bluetooth NIC for Bluetooth communication, and the like, as well as various combinations thereof.

It will be appreciated that the kernel 115 also may include various other types of modules which may be supported on a computer.

It will be appreciated that the computer 110 may include various other types of hardware and software, the typical arrangement and operation of which will be understood by one skilled in the art.

The peripheral connection 120 provides a connection between computer 110 and mobile computing device 130. The peripheral connection 120 is configured to support various data transactions, between mobile computing device 130 and computer 110, that are involved in the delivery of managed USB services. In one embodiment, the peripheral connection is a USB connection (e.g., a USB cable). Although the peripheral connection 120 is primarily depicted and described herein as being a USB connection, it will be appreciated that various peripheral connection 120 may be provided using one or more other types of connections (e.g., using a WiFi connection between computer 110 and mobile computing device 130, using a Bluetooth connection between computer 110 and mobile computing device 130, and the like).

The mobile computing device 130 is configured to support various functions of the managed USB service capability.

In general, mobile computing device 130 represents any type of device (1) that is configured to support multiple USB device classes (including support for switching between the available USB device classes and support for using the USB device classes to provide various types of managed USB services), (2) that includes a peripheral interface for enabling connection of the mobile computing device 130 to a computer (illustratively, for supporting peripheral connection 120 between mobile computing device 130 and computer 110), and (3) and that includes a network interface for enabling mobile computing device 130 to access a communication network (illustratively, for supporting the network connection 140 to access network 150, which thereby enables the mobile computing device 130 to access communication network 160 and services management infrastructure 170). For example, mobile computing device 130 may be a smartphone, a tablet computer, or any other suitable mobile computing device supporting such features.

As depicted in FIG. 1, mobile computing device 130 includes a user space 131 and a kernel 135.

The user space 131 is configured to support user interaction via mobile computing device 130, and may include one or more applications which may be used by users of computer 110. The kernel 135 is configured to interface the user space 131 to hardware of mobile computing device 130 (e.g., CPUs, memory, other devices, and the like, which have been omitted from FIG. 1 for purposes of clarity).

The user space 131 includes a pair of agents including a User Agent (UA) 132 and a Management Agent (MA) 133. The UA 132 and MA 133 each are configured to provide various functions of the managed DNS service capability. The UA 132 and the MA 133 may be implemented on mobile computing device 130 in any suitable manner. In one embodiment, for example, UA 132 and/or MA 133 may be implemented as software, stored in memory, which may be executed by a processor in order to provide the various functions of UA 132 and/or MA 133 depicted and described herein. The UA 132 and MA 133 may be implemented on mobile computing device 130 in any other suitable manner.

The kernel 135 includes a USB module 136 and a network module 137. It will be appreciated that the kernel 135 also may include various other types of modules which may be supported on a mobile computing device.

The USB module 136 is configured to support various functions of the managed USB service capability. The USB module 136 provides an external interface via peripheral interface 120, via which the mobile computing device 130 may connect to computer 110 within the context of supporting managed USB services. The USB module 136 includes various modules (omitted from FIG. 1 for purposes of clarity, but depicted and described in detail in FIG. 2) configured to enable mobile computing device 130 to support multiple USB device classes of various types of peripheral devices which may connect to the computer 110 via peripheral connection 120. The USB module 136 is configured to be able to be controlled locally and/or remotely to operate in any of the multiple USB device classes supported by USB module 136, thereby enabling USB module 136 to be configured to support various types of managed USB services.

The network module 137 provides one or more external interfaces via which the mobile computing device 130 may communicate with one or more types of access networks. For example, although omitted for purposes of clarity, it will be appreciated that network module 137 supports TCP/IP communications, and includes one or more network interface cards (NICs) configured to support communications with one or more types of communications networks. For example, the NIC(s) of mobile computing device 130 may include one or more of an Ethernet NIC for Ethernet-based communication, a Wireless Fidelity (WiFi) NIC for communication with WiFi networks, a cellular NIC for cellular communication with one or more types of cellular networks (e.g., 2.5G cellular network, a 3G cellular network, a 4G cellular network, and the like), a Bluetooth NIC for Bluetooth communication, and the like, as well as various combinations thereof. As depicted in FIG. 1, the network module 137 supports network connection 140 to access network 150, where network connection 140 and access network 150 may be any suitable type of connection/network (e.g., Ethernet, WiFi, cellular, and the like).

As described herein, the user space 131 is configured to support interaction with kernel 135, for enabling local and/or remote control of various managed USB services. The user space 131, as noted above, includes UA 132 and MA 133, which provide various functions in support of local and/or remote control of various managed USB services.

The UA 132 supports a Graphical User Interface (GUI) that provides the user of the mobile computing device 130 with access to various controls of the mobile computing device 130. In one embodiment, for example, the GUI supported by the UA 132 provides the user of the mobile computing device 130 with access to a USB interface selector of the USB module 136 of kernel 135 (e.g., via socket exchanges with MA 133 where MA 133 supports an interface to the USB interface selector of the USB module 136 of kernel 135, or in any other suitable manner) such that the user may select between the USB device classes supported by mobile computing device 130. In one embodiment, for example, the GUI supported by the UA 132 provides the user of the mobile computing device 130 with access to controls whereby the user may locally initiate one or more managed USB services, locally control and/or participate in one or more managed USB services initiated remotely, and the like, as well as various combinations thereof. In one embodiment, for example, the GUI supported by the UA 132 provides the user of the mobile computing device 130 with access to a user authentication interface. It is noted that UA 132 may be configured to provide the user of the mobile computing device 130 with access to various other controls and functions of the mobile computing device 130.

The MA 133 is configured to support various functions of the managed USB service capability. The MA 133 is configured to support local and remote access to USB module 136, thereby enabling local and remote control of various functions of the managed USB service capability (e.g., setting the USB device class to be used on mobile computing device 130, initiating and/or participating in one or more managed USB services via the mobile computing device 130, and the like, as well as various combinations thereof).

The MA 133 supports an interface 138 to USB module 136. The interface 138 supports local access (e.g., from UA 132) and remote access (e.g., from network connection 140 via network module 137) to USB module 136 in support of various functions of the managed USB service capability (e.g., setting the USB device class to be used on mobile computing device 130, initiating and/or participating one or more managed USB services via the mobile computing device 130, and the like, as well as various combinations thereof). It is noted that the interface 138 may be implemented in any suitable manner. The interface 138 is depicted and described in additional detail with respect to FIG. 2.

The MA 133 supports an interface 139 to network module 137. The interface 137 supports remote access to MA 133, thereby providing remote access to USB module 136 via the interface 138 between MA 133 and USB module 136. This, again, supports remote access to USB module 136 in support of various functions of the managed USB service capability (e.g., setting the USB device class to be used on mobile computing device 130, initiating and/or participating in one or more managed USB services via the mobile computing device 130, and the like, as well as various combinations thereof). It is noted that the interface 139 may be implemented in any suitable manner.

The MA 133 supports a local interface 134 to UA 132, thereby enabling MA 133 to support local access to kernel 135 for providing local control of (or at least participation in providing) various functions of the managed USB service capability.

For example, MA 133 may receive local commands and/or data from UA 132 (e.g., based on actions taken by the user of the mobile computing device 130 via the associated GUI) via interface 134, process the local commands and/or data, and provide associated local commands and/or data to USB module 136 of kernel 135 via interface 138 for controlling one or more functions (e.g., setting the USB device class to be used, initiating and/or participating in one or more managed USB services, and the like). Similarly, the MA 133 may receive responses from USB module 136 of kernel 135 via interface 138, process the responses, and provide associated responses to UA 132 via interface 134 (e.g., for presentation to the user of mobile computing device 130 via the associated GUI).

For example, the MA 133 may receive local commands and/or data from UA 132 via interface 134 and provide the local commands and/or data to network module 137 via interface 139 for propagation via network connection 140. Similarly, for example, the MA 133 may receive remote commands and/or data from network module 137 via interface 139 (received via network connection 140) and provide the remote commands and/or data to UA 132 via interface 134 (e.g., for presentation to the user of mobile computing device 130 via the associated GUI).

The MA 133 may support various other types of local interactions associated with providing local support for functions of the managed USB service capability.

The MA 133 supports a remote data connection to service management infrastructure 170 via network module 137 and network connection 140, thereby enabling MA 133 to support remote access to USB module 136 of kernel 135 for providing remote control of (or at least participation in providing) various functions of the managed USB service capability.

For example, MA 133 may receive commands and/or data from service management infrastructure 170 (e.g., from one or more administrator terminals via a service management system, or in any other suitable manner) via network connection 140 and network module 137, process the commands and/or data, and provide associated commands and/or data to USB module 136 of kernel 135 for controlling one or more functions (e.g., setting the USB device class to be used, initiating and/or participating in one or more managed USB services, and the like). Similarly, for example, the MA 133 may receive responses from USB module 136 of kernel 135, process the responses, and provide associated responses to service management infrastructure 170 via network module 137 and network connection 140 (e.g., for propagation to one or more one or more administrator terminals via a service management system such that the responses may be presented to one or more administrators via the one or more administrator terminals).

The MA 133 may be configured to store, on mobile computing device 130, encryption parameters that protect data exchanges of mobile computing device 140 that are related to managed USB services, such as local data exchanges between the mobile computing device 130 and computer 110 via peripheral connection 120 and/or remote data exchanges between mobile computing device 130 and the service management infrastructure 170 via network connection 140.

The MA 133 may be configured to provide various other functions in support of the managed USB service capability.

The USB module 136 and network module 137 may communicate directly (i.e., independent of MA 133). This communication path may be used in various ways. For example, this communication path may be used for purposes of facilitating communication between the USB module 136 and the network connection 140, independent of the MA 133. For example, this communication path may be used for purposes of facilitating communication between computer 110 and network connection 140 via USB module 116 of the computer 110 and USB module 136 of the mobile computing device 130, independent of the MA 133.

As described herein, the mobile computing device 130 may be any suitable type of mobile computing device, such as a smartphone, tablet computer, and the like.

In embodiments in which the mobile computing device 130 is implemented using a smartphone, the manner in which the smartphone is configured to Operate as a mobile computing device that is capable of supporting the managed USB service capability may depend on various factors (e.g., the type of smartphone, the type of Operating System (OS) used on the smartphone, the type of Instruction Set Architecture (ISA) used on the smartphone, and the like, as well as various combinations thereof).

In one embodiment, for example, the T-Mobile G1/HTC Dream smartphone, using an Android OS, may be configured to operate as a mobile computing device capable of supporting the managed USB service capability. It is noted that the Android OS is open-source and uses a Linux-based kernel. In one embodiment, the user space of the Android smartphone is partitioned by creating a chroot environment that runs a complete regular Linux distribution, which is cross-compiled for the Advanced Reduced Instruction Set Computer (RISC) Machine (ARM) Instruction Set Architecture (ISA) of the Android OS. The chroot environment is designed to be large enough to maintain all of the libraries that are needed for running C applications, such as the standard GNU libc (e.g., 750 MB, at a time when 64 GB Micro Secure Digital (SD) cards are readily available). The software for providing the UA 132 and the MA 133 is implemented using C code. The cross-compilation of the C code base for the ARM ISA, and its installation in a chroot environment, adds a standard Linux user space to the Android OS platform with no impact on its native capabilities. In one embodiment, the UA 132 is implemented as an Android application outside of the chroot environment while the remaining software, including software for the MA 133, is installed within the chroot environment. It is noted that, since the chroot environment isolates the file system, but not the kernel nor the network, the UA 132 can still communicate with the MA 133 using network sockets. It is noted that the Android OS kernel supports modules for some, but not all, of the USB device classes. When the existing modules for USB device classes of the Android OS kernel are sufficient to enable the managed USB services intended to be supported, no modification of the existing modules for USB device classes is needed. When the existing modules for USB device classes of the Android OS kernel are not sufficient to enable the managed USB services intended to be supported (e.g., modules for some USB device classes, such as the USB Mass Storage Class, are missing in the native Android OS kernel), the T-Mobile G1/HTC Dream smartphone is configured to include the missing module(s) for the USB device class(es) to be supported (e.g., by porting the respective module(s) from the regular Linux kernel into the Android kernel, or in any other suitable manner). In one embodiment, for networking, the T-Mobile G1/HTC Dream smartphone is configured to support tethering by running a DHCP server and by using the iptables framework of Linux for network address translation (NAT) functions. In one embodiment, for VPN connectivity to the service management infrastructure 170, a commercial IPsec implementation for Linux (e.g., including a kernel IPsec driver and a user-space Internet Key Exchange (IKE) utility controlled by the MA 133) is installed on the T-Mobile G1/HTC Dream smartphone. In one embodiment, the storage space on the SD card of the T-Mobile G1/HTC Dream smartphone is partitioned to create static allocations for the chroot Linux environment, for the encryption keys, and for the data to be stored when the smartphone operates as a USB Mass Storage Class device. It is noted that various portions of the software may be compiled in any suitable manner (e.g., the iptables, USB software, VPN software, and like software may be compiled using open source code that is publicly available for the T-Mobile G1/HTC Dream smartphone).

It is noted that the T-Mobile G1/HTC Dream smartphone may be configured, to operate as a mobile computing device capable of supporting the managed USB service capability, in any other suitable manner. Similarly, it is noted that the above-described approach, as well as variations thereof, may be used for configuring other similar smartphones (e.g., those using the Android OS and the ARM ISA) to operate as mobile computing devices capable of supporting the managed USB service capability. Similarly, it is noted that other smartphones, using other OSs and/or ISAs, also may be configured to operate as mobile computing devices capable of supporting the managed USB service capability. In other words, although primarily described with respect to configuration of the T-Mobile G1/HTC Dream smartphone using the Android OS to operate as a mobile computing device capable of supporting the managed USB service capability, it is noted that any other suitable smartphone using any other suitable OS (e.g., an Apple iPhone using the iOS operating system, a Nokia X7 smartphone using the Symbian OS, and the like) may be configured to operate as a mobile computing device capable of supporting the managed USB service capability. Furthermore, although primarily depicted and described herein with respect to configuration of existing smartphones to operate as a mobile computing device capable of supporting the managed USB service capability, it is noted that smartphones also may be designed to support the functions of a mobile computing device as depicted and described herein. Moreover, although primarily depicted and described herein with respect to configuration or design of smartphones to support functions of a mobile computing device, it is noted that various other types of devices may be configured or designed to provide functions of a mobile computing device supporting the managed USB service capability.

The network connection 140 provides a connection between the mobile computing device 130 and access network 150, and the access network 150 facilitates communications of mobile computing device 130 with other networks and devices (illustratively, communication network 160 and service management infrastructure 170). The network connection 140 may be any suitable type of network connection via which mobile computing device 130 may access a communication network, such as a wired connection (e.g., an Ethernet connection and the like), a WLAN connection (e.g., WiFi and the like), a WWAN connection (e.g., cellular and the like), and the like. Similarly, the access network 150 may be any suitable type of communication network with which the mobile computing device 130 may communicate, which may include wired networks (e.g., cable, DSL, and the like) and/or wireless networks (e.g., WiFi, cellular, and the like). Although primarily depicted and described with respect to a single network connection 140 and a single access network 150, it will be appreciated that mobile computing device 130 may be configured to support multiple types of access connections via multiple types of access networks and, thus, that mobile computing device 130 may have multiple different access networks available for communication at any given time.

The communication network 160 represents any communication network with which mobile computing device 130 may communicate via access network 150. For example, communication network 160 may include a private data network (e.g., an enterprise network of an enterprise, a core data network of a communications service provider, and the like) and/or a public data network (e.g., the Internet). In one embodiment, communication network 160 may support communications between mobile computing device 130 and service management infrastructure 170.

The service management infrastructure 170 is configured to support remote management of managed USB services.

The service management infrastructure 170 may be implemented in any suitable manner, which may depend on the type of entity providing the managed USB services. For example, the service management infrastructure 170 may be controlled by an enterprise (e.g., such that service management infrastructure 170 may be implemented within an enterprise network of the enterprise), by a communications service provider (e.g., such that service management infrastructure 170 may be implemented within a communication network of the communications service provider), by a managed USB services provider (e.g., such that service management infrastructure 170 may be implemented within a communication network of the managed USB services provider), and the like.

The service management infrastructure 170 includes a service management system 171 and an administrator terminal 175.

The service management system 171 is a point of entry for remote administration of managed USB services. The service management system 171 supports a web-based interface (e.g., GUI or other suitable interface) configured to support functions such as provisioning, management, and troubleshooting of mobile computing devices (illustratively, mobile computing device 130) and, optionally, also computers made accessible through mobile computing devices (illustratively, computer 110). For example, the web-based interface of service management system 171 may support commands for adding, removing, configuring, and tracking mobile computing devices configured to support managed USB services for computers. For example, the web-based interface of service management system 171 may support commands for activating, managing, and deactivating managed USB services. For example, the web-based interface of the service management system 171 may support presentation of information associated with various management functions which may be provided via the service management system 171. The web-based interface of the service management system 171 may support any other commands and/or presentation capabilities associated with managed USB services which may be controlled remotely from service management infrastructure 170. The web-based interface is adaptable for display via administrator terminal 175.

The service management system 171 supports a remote data connection 172 with MA 133 of mobile computing device 130.

The remote data connection 172 supports communication between MA 133 of mobile computing device 130 and service management system 171. For example, the remote data connection 172 may convey commands and/or data from service management system 171 to MA 133 for use in controlling various functions of the managed USB service capability (e.g., setting the USB device class to be used on mobile computing device 130, initiating and/or participating in one or more managed USB services via the mobile computing device 130, and the like, as well as various combinations thereof). Similarly, for example, the remote data connection 172 may convey information, related to the control of various functions of the managed USB service capability (e.g., responses to provisioning, management, and/or troubleshooting requests), from MA 133 to service management system 171. The remote data connection 172 may support communication of any other information to and from mobile computing device 130 within the context of providing provisioning, management, and/or troubleshooting of mobile computing device 130 and/or computer 110.

The remote data connection 172 may be a secure connection (e.g., a secure IP connection provided using IPSec, SSH, TSL/SSL, and/or any other suitable type of security measures). In one embodiment, service management system 171 may provide VPN termination facilities for secure connections to the mobile computing devices.

The administrator terminal 175 interfaces with service management system 171 via a connection 176, thereby enabling an administrator to control administration of managed USB services remotely. For example, the administrator may use administrator terminal 175 to initiate requests related to provisioning, management, and/or troubleshooting of mobile computing device 130 and/or computer 110. Similarly, for example, the administrator may use administrator terminal 175 to review responses related to provisioning, management, and/or troubleshooting of mobile computing device 130 and/or computer 110. The connection 176 between administrator terminal 175 and service management system 171 may be provided in any suitable manner and, in some cases, may be secured (e.g., via encrypted tunnels or using any other suitable security mechanisms). In this manner, administrator terminal 175 is configured to support remote control of managed USB services for computers such as computer 110 via mobile computing devices such as mobile computing device 130.

Although primarily depicted and described with respect to use of a single service management system and a single administrator terminal, it will be appreciated that any suitable numbers of service management systems and administrator terminals may be used.

Although primarily depicted and described herein with respect to an embodiment in which the service management system 171 is a dedicated server (e.g., within the enterprise network supporting managed USB services in an enterprise application, within the service provider network supporting managed USB services in a consumer application, and the like), it is noted that in at least some embodiments a cloud-based implementation of service management system 171 may be used. In one embodiment, for example, service management system 171 may be implemented as a virtual server in the cloud, where a cloud services provider can allocate one or more virtual service management system instances within the cloud. In one such embodiment, virtual service management system instances may be allocated within the cloud on demand, thereby enabling adjustment of the number of virtual service management system instances as needed or desired (e.g., based on the fluctuating load of connected remote users). It is noted that such an arrangement benefits the cloud service provider with an important expansion of the product portfolio (e.g., where virtual service management is instantiated using an application enablement model and the cloud service provider can collect pay-per-use fees which have plenty of room for large margins) and also benefits the service provider supporting the managed USB services (e.g., by avoiding the addition of new physical components to its IT infrastructure, thereby eliminating the upfront capital expenses for the purchase and the operational expenses for real estate, power, maintenance, and the like).

It is noted that system 100 may be utilized to provide the managed USB service capability for various applications associated with various types of environments (e.g., for enterprise applications in enterprise network environments, for consumer applications in various types of communication network environments, and the like).

In an enterprise application, for example, various embodiments of the managed USB service capability enable local and/or remote control of operation and/or management of enterprise computers of enterprise employees within an enterprise network environment.

For example, in at least some embodiments, remote access to the enterprise network by an enterprise user does not require the enterprise user to always use the same enterprise computer to log into the enterprise network (e.g., at least some embodiments enable the enterprise user to a mobile computing device such that any computer may be used for remote enterprise access without exposing the enterprise to added security threats).

For example, in at least some embodiments, enhanced security enabled by use of smart-card technology for enterprise network access is retained even when both the enterprise computer and the smart card (which is instantiated on a mobile computing device) are lost (e.g., access to the computer resources of the computer is denied remotely by remote revocation of the security certificates in the mobile computing device).

For example, in at least some embodiments, remote management of an enterprise computer does not require the enterprise computer to be equipped with specific hardware/software for this purpose and/or does not require the enterprise computer to be attached to an Ethernet or WiFi network (e.g., at least some embodiments may be provided via a mobile computing device without requiring any hardware/software installation in the enterprise computer and/or at least some embodiments may be provided anywhere the mobile computing device can gain access to a data network (e.g., WiFi, 3G/4G broadband wireless, and the like)).

For example, in at least some embodiments, remote management of an enterprise computer is provided by enabling enterprise IT administrators to gain remote access to enterprise computers at any time, independent of the geographic location of the enterprise computer and the gravity of the cause for the malfunctioning of the enterprise computer. This is advantageous for enterprise laptop users, especially mobile employees that spend long periods of time away from any corporate facility, who face abrupt and sometimes prolonged productivity disruptions when their laptops incur software and network malfunctioning issues. While, in the absence of managed USB service capability, some of the software malfunctioning issues can be addressed by an IT administrator through remote login into the laptop, a large set of software issues can make remote access to the laptop impossible, thereby forcing the laptop user to seek help at an enterprise service center. This may include either bringing the laptop to the enterprise service center, or shipping the laptop to the enterprise service center for repair and then having the repaired laptop shipped back to the remote location (i.e., if the enterprise service center is not conveniently located for the laptop user, the resulting productivity disruption can last for days or weeks). As noted above, various embodiments of the managed USB service capability easily overcome such problems by enabling an enterprise user that is away from the enterprise premises to use a mobile computing device to gain immediate access to computer remediation resources as soon as computer operation issues arise, without having to physically take the computer to a service center.

For example, in at least some embodiments, remote serial console access to an enterprise device (e.g., employee computer, network equipment, and the like) is possible, via a mobile computing device, even where the network connectivity typically available to the enterprise device is no longer available.

It is noted that various embodiments of the managed USB service capability use a mobile computing device to extend the set of operational and connectivity conditions under which the computer of a mobile employee is fully included within the IT perimeter of the enterprise, thereby avoiding productivity disruptions, enhancing the security of the enterprise by minimizing the deployment time of software updates and patches, reducing the operational costs involved in the maintenance of a population of geographically dispersed IT resources, and providing various other advantages.

These and other functions and advantages may be realized when embodiments of the managed USB service capability are applied within the enterprise context.

In a consumer application, for example, various embodiments of the managed USB service capability enable local and/or remote control of consumer services within various types of communication networks.

For example, in at least some embodiments, remote management of a computer does not require the computer to be equipped with specific hardware/software for this purpose and/or does not require the computer to be attached to an Ethernet or WiFi network (e.g., at least some embodiments may be provided via a mobile computing device without requiring any hardware/software installation in the computer and/or at least some embodiments may be provided anywhere the mobile computing device can gain access to a data network (e.g., via WiFi, 3G/4G broadband wireless, and the like)).

For example, in at least some embodiments, remote management of a computer is provided by enabling service provider administrators to gain remote access to the computer at any time, independent of the geographic location of the computer and the gravity of the cause for the malfunctioning of the computer.

In such consumer applications, it is noted that services may be provided by any suitable entities (e.g., communications service providers, companies that sell computers and provide associated IT support for its computers, various third-party service providers, and the like).

These and other functions and advantages may be realized when embodiments of the managed USB service capability are applied within the consumer context.

Specific types of managed USB services which may be used to provide such functions and advantages with various types of environments are described in additional detail hereinbelow.

As described herein, various managed USB services may be supported by enabling configuration of mobile computing device 130 to be able to operate in different USB device classes. The configuration of mobile computing device 130 to operate in different USB device classes (including support for dynamic switching between USB device classes) for supporting managed USB services for computer 110 may be better understood by way of reference to FIG. 2.

Figure 2:
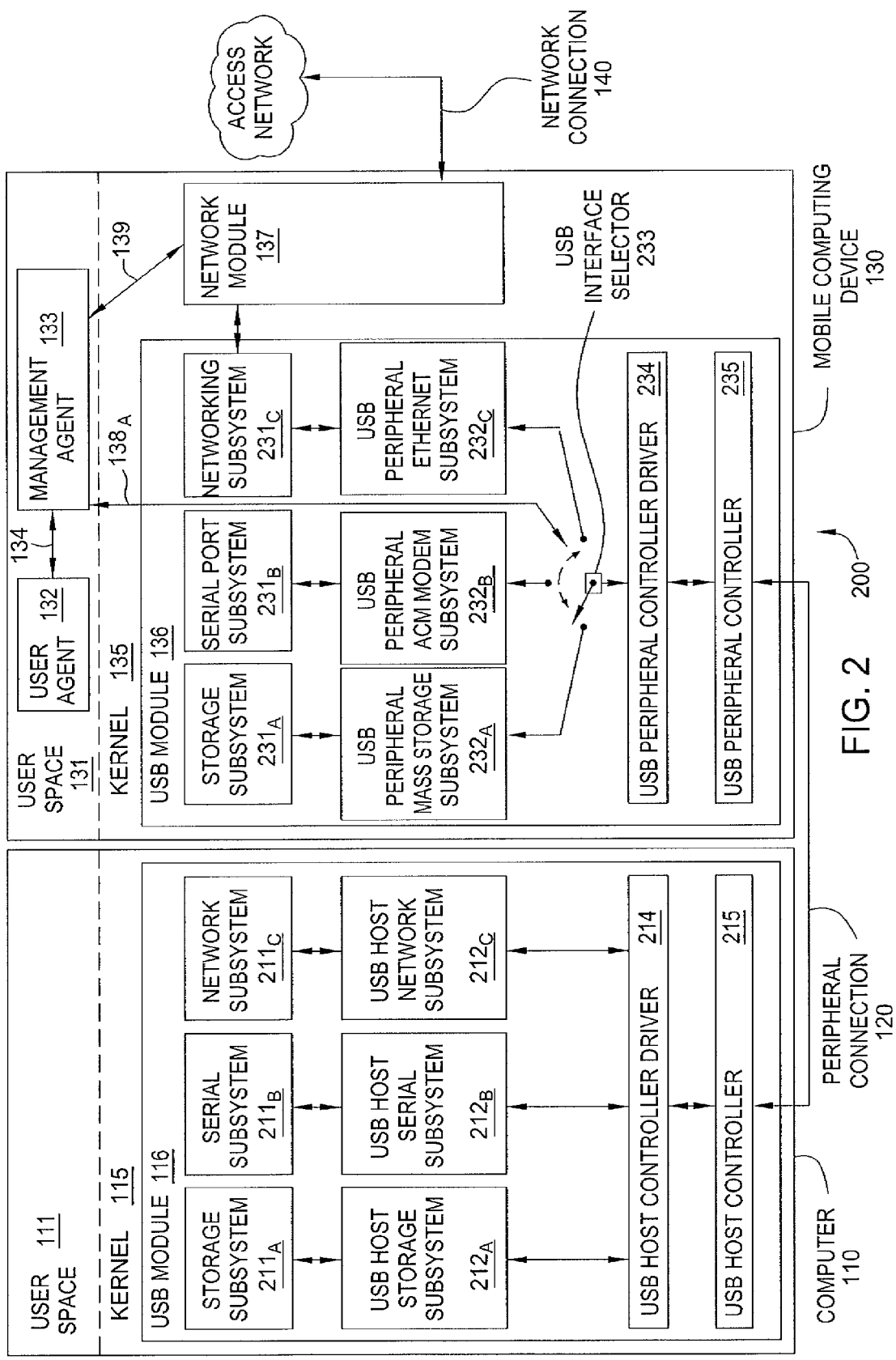
FIG. 2 depicts a portion of the exemplary system of FIG. 1, illustrating configuration of the mobile computing device to support USB device classes which may be used to provide managed USB services for the computer.

FIG. 2 depicts a portion of the exemplary system of FIG. 1, illustrating configuration of the mobile computing device to support USB device classes which may be used to provide managed USB services for the computer.

As depicted in FIG. 2, system 200 includes many of the elements of system 100 of FIG. 1. Thus, descriptions of these elements are not repeated.

As depicted in FIG. 2, the USB module 116 of computer 110 includes various modules configured to enable computer 110 to support multiple USB device classes of various types of peripheral devices which may connect to computer 110 via peripheral interface 120.

The USB module 116 includes three generic subsystems 211, which include a Storage Subsystem $211_A$, a Serial Subsystem $211_B$, and a Network Subsystem $211_C$. It will be appreciated that the generic subsystems 211 are configured to be layered on top of specialized, device-specific subsystems (including the USB-based subsystems utilized to provide various functions of the managed USB service capability). In other words, although the generic subsystems 211 are depicted and described herein as forming part of a USB module 116 (for purposes of clarity), it will be appreciated that the generic subsystems are not USB-specific and can be layered on top of and, thus, associated with, various other types of device-specific subsystems which may be supported within computer 110.

The USB module 116 also includes three USB-specific subsystems 212, which include a USB Host Storage Subsystem $212_A$, a USB Host Serial Subsystem $212_B$, and a USB Host Network Subsystem $212_C$, which interface with Storage Subsystem $211_A$, Serial Subsystem $211_B$, and Network Subsystem $211_C$, respectively. It is noted that USB Host Storage Subsystem $212_A$, USB Host Serial Subsystem $212_B$, and USB Host Network Subsystem $212_C$ are configured to support the USB Mass Storage device class, the USB ACM Modem device class, and the USB Ethernet device class, respectively. It is further noted that the USB Ethernet device class may be provided using any suitable type of USB Ethernet device class (e.g., the standard USB CDC Ethernet device class, the USB Remote Network Driver Interface Specification (RNDIS) device class, and the like).

The USB module 116 also includes a USB Host Controller Driver 214 and a USB Host Controller 215. The USB-specific subsystems 212 each interface with the USB Host Controller Driver 214. The USB Host Controller Driver 214 interfaces with the USB Host Controller 215. The USB Host Controller 215 interfaces with peripheral connection 120 (which, in the exemplary embodiment, is a USB cable providing an interface to mobile computing device 130).

It is noted that, although primarily depicted and described with respect to specific numbers and types of generic subsystems 211, kernel 115 of computer 110 may include any suitable numbers and types of generic subsystems (some or all of which may be layered on top of USB-specific subsystems). It is noted that, although primarily depicted and described with respect to specific numbers and types of USB-specific subsystems 212 (and, similarly, specific numbers and types of USB device classes supported), kernel 115 of computer 110 may include any suitable numbers and types of USB-specific subsystems (and, thus, may support any suitable numbers and types of USB device classes (e.g., fewer or more USB device classes, other USB device classes not represented here, and the like, as well as various combinations thereof)). It is further noted that the arrangement of kernel 115 of computer 110 may be modified in any suitable manner.

As depicted in FIG. 2, the USB module 136 of mobile computing device 130 includes various modules configured to enable mobile computing device 130 to operate in any of the multiple USB device classes supported by computer 110 (including support for switching between the multiple USB device classes of the mobile computing device 130 based on the type of managed USB service to be provided for computer 110).

The USB module 136 includes three generic subsystems 231, which include a Storage Subsystem $231_A$, a Serial Port Subsystem $231_B$, and a Networking Subsystem $231_C$. It will be appreciated that the generic subsystems 231 are configured to be layered on top of specialized, device-specific subsystems (including the USB-based subsystems utilized to provide various functions of the managed USB service capability). In other words, although the generic subsystems 231 are depicted and described herein as forming part of a USB module 136 (for purposes of clarity), it will be appreciated that the generic subsystems are not USB-specific and can be layered on top of and, thus, associated with, various other types of device-specific subsystems which may be supported within mobile computing device 130.

The USB module 136 also includes three USB-specific subsystems 232, which include a USB Peripheral Mass Storage Subsystem $232_A$, a USB Peripheral ACM Modem Subsystem $232_B$, and a USB Peripheral CDC Ethernet Subsystem $232_C$, which interface with Storage Subsystem $231_A$, Serial Port Subsystem $231_B$, and Networking Subsystem $231_C$, respectively. It is noted that USB Peripheral Mass Storage Subsystem $232_A$, USB Peripheral ACM Modem Subsystem $232_B$, and USB Peripheral Ethernet Subsystem $232_C$ are configured to support the USB Mass Storage device class, the USB ACM Modem device class, and USB Ethernet device class, respectively.

The USB module 136 also includes a USB Interface Selector 233, a USB Peripheral Controller Driver 234, and a USB Peripheral Controller 235.

The USB Interface Selector 233 interfaces with the USB Peripheral Controller Driver 234. The USB Peripheral Controller Driver 234 interfaces with the USB Peripheral Controller 235. The USB Peripheral Controller 235 interfaces with peripheral connection 120 (which, in the exemplary embodiment, is a USB cable providing an interface to computer 110).

The USB Interface Selector 233 is configured to select between the USB-specific subsystems 232 in response to commands received from MA 133 of user space 131 (e.g., in response to local commands received at MA 133 from UA 132 and/or in response to remote commands received at MA 133 from service management infrastructure 170). The USB Interface Selector 233 is connected to USB Peripheral Controller Driver 234, such that selection of one of the USB-specific subsystems 232 by the USB Interface Selector 233 causes the selected one of the USB-specific subsystems 232 to be connected to USB Peripheral Controller Driver 234 and, thus, to the USB Peripheral Controller 235 for communication with computer 110 via peripheral connection 120.

As described herein, MA 133 is configured to control selection of USB device classes, including switching between USB device classes in order to support various managed USB services. The MA 133 may be configured to switch between USB device classes at any suitable time, even during runtime without restarting the mobile computing device 130. The MA 133 is configured to provide one or more commands to USB Interface Selector 233 for causing USB Interface Selector 233 to select one of the USB-specific subsystems 232. For example, MA 133, in response to one or more local or remote commands requesting configuration of mobile computing device 130 to operate in the USB Mass Storage device class (or requesting a managed USB service requiring operation of mobile computing device 130 in the USB Mass Storage device class), may instruct USB Interface Selector 233 to select USB Peripheral Mass Storage Subsystem $232_A$, thereby coupling USB Peripheral Mass Storage Subsystem $232_A$ to USB Peripheral Controller Driver 234 and causing the mobile computing device 130 to expose a USB Mass Storage interface to computer 110 via peripheral connection 120. Similarly, for example, MA 133, in response to one or more local or remote commands requesting configuration of mobile computing device 130 to operate in the USB ACM Modem device class (or requesting a managed USB service requiring operation of mobile computing device 130 in the USB ACM Modem class), may instruct USB Interface Selector 233 to select USB Peripheral ACM Modem Subsystem $232_B$, thereby coupling USB Peripheral ACM Modem Subsystem $232_B$ to USB Peripheral Controller Driver 234 and causing the mobile computing device 130 to expose a USB ACM Modem interface to computer 110 via peripheral connection 120. Similarly, for example, MA 133, in response to one or more local or remote commands requesting configuration of mobile computing device 130 to operate in the USB Ethernet device class (or requesting a managed USB service requiring operation of mobile computing device 130 in the USB Ethernet device class), may instruct USB Interface Selector 233 to select USB Peripheral Ethernet Subsystem $232_C$, thereby coupling USB Peripheral Ethernet Subsystem $232_C$ to USB Peripheral Controller Driver 234 and causing the mobile computing device 130 to expose a USB Ethernet interface to computer 110 via peripheral connection 120.

It is noted that, although primarily depicted and described with respect to specific numbers and types of generic subsystems 231, kernel 135 of mobile computing device 130 may include any suitable numbers and types of generic subsystems (some or all of which may be layered on top of USB-specific subsystems). It is noted that, although primarily depicted and described with respect to specific numbers and types of USB-specific subsystems 232 (and, similarly, specific numbers and types of USB device classes supported), kernel 135 of mobile computing device 130 may include any suitable numbers and types of USB-specific subsystems (and, thus, may support any suitable numbers and types of USB device classes (e.g., fewer or more USB device classes, other USB device classes not represented here, and the like, as well as various combinations thereof)). It is further noted that arrangement of kernel 135 of mobile computing device 130 may be modified in any suitable manner.

As described herein, mobile computing device 130 is configured to support USB device classes which may be used to provide managed USB services for the computer 110. Furthermore, mobile computing device 130 may be configured to store various programs and instructions which, when executed by a processor, cause the mobile computing device 130 to perform one or more processes in support of providing managed USB services for the computer 110.

Figure 3:
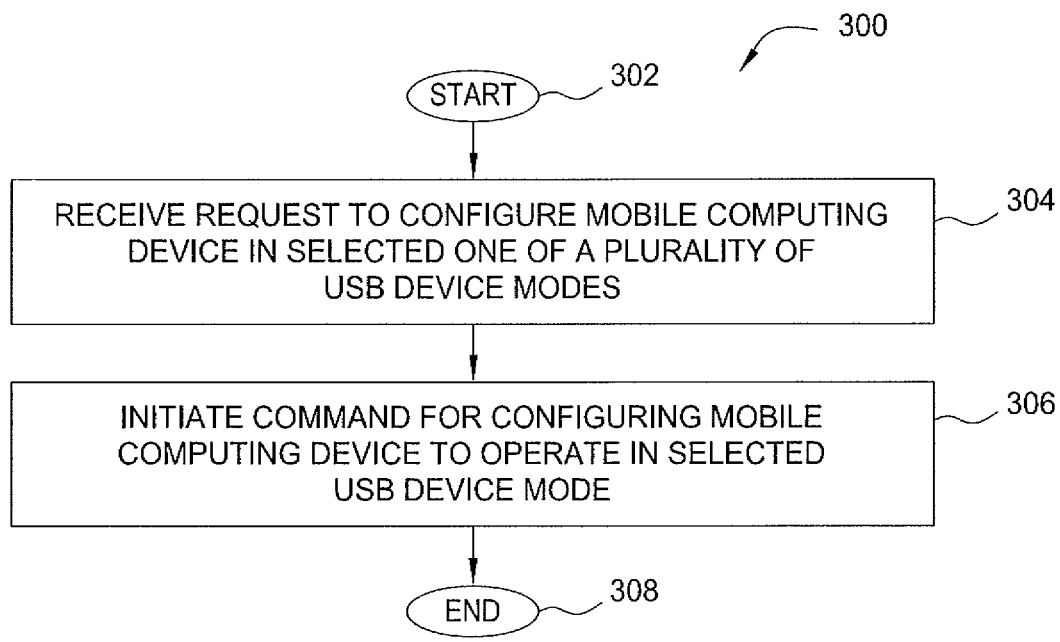
FIG. 3 depicts one embodiment of a method for enabling remote control of a USB device class of a mobile computing device.

FIG. 3 depicts one embodiment of a method for enabling remote control of a USB device class of a mobile computing device.

At step 302, method 300 begins.

At step 304, a request to configure the mobile computing device to operate in a selected one of a plurality of USB device classes is received. The request is received at the mobile computing device (e.g., at a processor, by a management agent, and the like) via a remote data connection between the mobile computing device and a remote device. The request may be an explicit request for the mobile computing device to use a specific USB device class (e.g., which may be initiated prior to initiation of an associated managed USB service to be provided to a computer via the mobile computing device). The request may be a request for the mobile computing device to provide a managed USB service to a computer, where the request may indicate the USB device class to be used in order to provide the managed USB service or the mobile computing device may be configured to determine the USB device class to be used based on the type of managed USB service requested for the computer.

At step 306, a command, for configuring the mobile computing device to operate in the selected USB device class, is initiated. The command may be initiated in any suitable manner. In one embodiment, for example, the mobile computing device supports a management agent (illustratively, MA 133 depicted and described with respect to FIGS. 1 and 2) that is configured to receive the request and initiate the associated command (e.g., by sending the command to a USB interface selector or in any other suitable manner).

At step 308, method 300 ends.

Although method 300 is primarily depicted and described as ending (for purposes of clarity), it is noted that various other actions may be taken following configuration of the mobile computing device to operate in the selected USB device class (e.g., providing a managed USB service using the configuration of the mobile computing device to operate in the selected USB device class or any other suitable actions).

Figure 4:
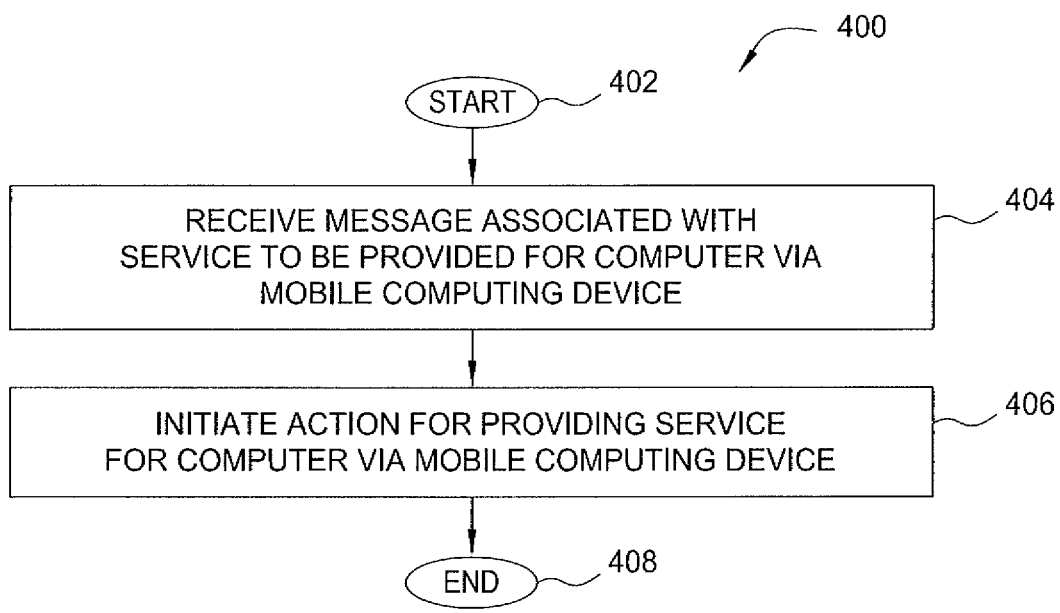
FIG. 4 depicts one embodiment of a method for using a mobile computing device to provide a managed USB service for a computer.

FIG. 4 depicts one embodiment of a method for using a mobile computing device to provide a managed USB service for a computer.

At step 402, method 400 begins.

At step 404, a message, associated with a managed USB service to be provided for a computer, is received. The message is received at the mobile computing device via a remote data connection between the mobile computing device and a remote device. The message may include one or more of a request for the mobile computing device to provide the managed USB service for the computer, one or more commands and/or data to be used by the mobile computing device and/or the computer when providing the managed USB service for the computer, and the like, as well as various combinations thereof. The types of messages which may be received may be better understood by considering the various examples of managed USB services which may be provided in conjunction with embodiments of the managed USB service capability, as described herein.

At step 406, an action, for providing the managed USB service for the computer via the mobile computing device, is initiated. The action may include one or more of processing the message on mobile computing device, initiating one or more commands to be processed on the mobile computing device (e.g., for configuring the mobile computing device to operate in a USB device class needed for the managed USB service, for initiating establishment of a particular type of connection, for causing the mobile computing device to communicate via a network connection, for causing the mobile computing device to with the computer via a peripheral connection, and the like, as well as various combinations thereof), communicating via a network connection of the mobile computing device (e.g., sending information via the network connection (e.g., to the remote device and/or any other suitable device), requesting and/or receiving information via the network connection (e.g., to the remote device and/or any other suitable device), and the like), communicating with the computer via the peripheral connection between the mobile computing device and the computer (e.g., sending one or more commands and/or data from the mobile computing device to the computer, receiving one or more commands and/or data at the mobile device from the computer, and the like), and the like, as well as various combinations thereof. The types of actions which may be performed may be better understood by considering the various examples of managed USB services which may be provided in conjunction with embodiments of the managed USB service capability, as described herein.

At step 408, method 400 ends.

Although method 400 is primarily depicted and described as ending (for purposes of clarity), it is noted that various other messages may be received and/or actions may be initiated in conjunction with providing the managed USB service and/or providing one or more other managed USB services for the computer using the mobile computing device.

Although method 400 is primarily depicted and described with respect to providing a managed USB service for the computer, it is noted that method 400 may be used to use the mobile computing device to provide any other suitable type of service for the computer.

As described herein, the managed USB service capability enables various types of managed USB services to be supported, six of which are described below. It is noted that although the six managed USB services are primarily depicted and described herein within the context of an embodiment in which the mobile computing device 130 is a smartphone 130 and the six managed USB services are provided within an enterprise environment, the six managed USB services also may be supported where mobile computing device 130 is any suitable type of device other than a smartphone and/or where the six managed USB services are provided within any suitable type of environment other than an enterprise environment.

In one embodiment, the managed USB service capability is configured to support a Managed USB Internet Tethering Service.

In general, Internet tethering is the extension of the WWAN connection of the smartphone 130 (e.g., 2.5G cellular connection, 3G cellular connection, and the like) to the attached computer 110. This enables the computer 110 to access the Internet when more typical media for network connectivity (e.g., Ethernet, WiFi, and the like) are not available to the computer 110 (e.g., while traveling when such wired and local wireless media are unavailable, in response to a problem on the computer 110 that renders such wired and local wireless media are unavailable for Internet access, and the like).

In one embodiment, the Managed USB Internet Tethering Service uses smartphone 130 as a USB Ethernet device and, thus, smartphone 130 is configured to operate in the USB Ethernet device class, such that smartphone 130 exposes a USB Ethernet interface to the computer 110.

In one embodiment, the Managed USB Internet Tethering Service is provided by configuring the smartphone 130 to operate as a router having Network Address Translation (NAT) and Dynamic Host Control Protocol (DHCP) server capability, thereby enabling the computer 110 to communicate with the smartphone 130 and, thus, with access network 150 via network connection 140, such that the computer may communicate with communication network 160 (e.g., the Internet). In one embodiment, the iptables framework is used to provide the NAT functionality, which enables IP masquerading. In one embodiment, the dnsmasq utility issues a private IP address to computer 110 (i.e., providing the DHCP server functionality) and relays DNS settings, from a WWAN access point with which smartphone 130 communicates (e.g., an access point of access network 150) to computer 110. In one embodiment, using a lightweight web server (e.g., with lighttpd), the computer 110 can access files on the smartphone 130 through a web-based interface (e.g., by activation of the SSH server daemon, the computer 110 is able to log into the smartphone 130 and, further, to transfer files to and from the smartphone 130 using an encrypted interface).

In at least some implementations, the Managed USB Internet Tethering Service should not require installation of any new software on the computer 110, at least because the Managed USB Internet Tethering Service merely uses the driver for the USB Ethernet device class (which is covered by the USC Ethernet driver expected to be available on computer 110). For example, where the computer 110 is a Linux-based computer, there is probably not a need for any installation of software on the computer 110, because the Linux USB Ethernet driver supports the standard USB Ethernet device class.

In at least some implementations, the Managed USB Internet Tethering Service may require installation of new software on the computer 110. For example, some Microsoft Operating Systems (e.g., Windows XP and Windows 7) do not support the official USB CDC Ethernet device class, and instead support a proprietary standard called USB RNDIS. As a result, where the computer 110 uses such a Windows Operating System, the smartphone 130 is an Android-based smartphone, and the USB Ethernet driver on the Android-based smartphone can be configured to support both the USB CDC Ethernet device class and the USB RNDIS standard but the RNDIS driver on the Android-based smartphone cannot be configured to communicate with the default Windows RNDIS driver on the computer, the standard USC CDC Ethernet driver may be installed on Windows in computer 110 in order to enable USB Ethernet networking between the smartphone 130 and the computer 110. It is noted that where installation of new software on computer 110, in order to support and/or supplement the Managed USB Internet Tethering Service, is required or desired, any suitable type(s) of software may be installed on computer 110 at any suitable time.

It is noted that embodiments of the Managed USB Internet Tethering Service provide various advantages over other methods of providing Internet tethering. For example, Internet tethering may be provided by configuring a smartphone to operate as a WiFi access point; however, this approach may consume the charge of the battery of the smartphone because, in general, WiFi is not designed to minimize power consumption. For example, Internet tethering may be provided by configuring a smartphone to expose a Bluetooth interface to a computer, which the computer may then use for dialup networking; however, this approach bypasses the smartphone and connects the computer directly to the Internet, thereby interfering with synchronization of applications between the computer and the smartphone.

In one embodiment, the managed USB service capability is configured to support a Managed USB VPN Tethering Service.

In general, while Internet tethering provides connectivity from the computer 110 to the outside world, there are many cases in which users also need or desire to access remote devices via secure connections (e.g., an enterprise user who accesses his or her enterprise network via a VPN connection that is secured by user authentication and data encryption). It is noted that some existing VPN technologies include IPSec, Point-to-Point Tunneling Protocol (PPTP), and SSH. It is further noted that TLS/SSL tunnels, which may be opened with a web browser and do not require the installation/configuration of a software client, may be used to provide VPN connections (although they typically only support web-based applications). In existing solutions for remote enterprise access that utilize technologies other than TLS/SSL tunnels, a VPN client is included in the pre-imaged computer that is provided to the enterprise user and, as such, these technologies only work when the enterprise user has access to the pre-imaged computer that is provided to the enterprise user. As a result, enterprise access is not possible if the pre-imaged computer that is provided to the enterprise user is broken or not within reach and, further, even any other computers that may be available to the enterprise user (e.g., from friends or at an Internet café) cannot be used for enterprise access because they do not include the necessary VPN client with the proper configuration. It is noted that various embodiments of the Managed USB VPN Tethering Service may solve these and other problems associated with VPN access.

In one embodiment, the Managed USB VPN Tethering Service uses the smartphone 130 as a USB Ethernet device and, thus, the smartphone 130 is configured to operate in the USB Ethernet device class, such that smartphone 130 exposes a USB Ethernet interface to the computer 110.

The Managed USB VPN Tethering Service (similar to the Managed USB Internet Tethering Service) enables the user of the smartphone 130 to connect any computer (e.g., the computer 110 given to the user or any other computer) to the smartphone 130; however, unlike in the Managed USB Internet Tethering Service where the computer 110 connects to the general Internet, the Managed USB VPN Tethering Service enables the computer 110 to connect to a VPN gateway of the enterprise using a VPN client installed in the smartphone 130 (where the VPN client in smartphone 130 offloads the authentication and encryption functions from the computer 110).

The Managed USB VPN Tethering Service is invoked on smartphone 130. The Managed USB VPN Tethering Service may be invoked on the smartphone 130 in any suitable manner. For example, the Managed USB VPN Tethering Service may be invoked locally via UA 132 and MA 133, where the user selects the Managed USB VPN Tethering Service via the UA 132 and provides the necessary authentication credentials to establish the VPN tunnel between the smartphone 130 and the enterprise. For example, the Managed USB VPN Tethering Service may be invoked remotely via MA 133 where remote commands received at the smartphone 130 via the network connection 140 are processed for enabling selection of the Managed USB VPN Tethering Service on smartphone 130, and the local user or a remote enterprise administrator may provide the necessary authentication credentials to establish the VPN tunnel between the smartphone 130 and the enterprise. The user connects the smartphone 130 to computer 110 using the USB cable, and the computer 110 perceives the smartphone 130 as a USB Ethernet device. The dnsmasq utility on the smartphone 130 relays to the computer 110 its enterprise IP address (obtained from the VPN gateway at the edge of the enterprise network), as well as other network parameters associated with the enterprise network (e.g., the identifier of the DNS server, the identifier of the WINS server, and the like). The smartphone 130 is configured to operate as the default router for the computer 110 and, thus, the computer 110 directs all of its traffic to the smartphone 130 where it is encrypted and sent over the network connection 140 currently serving smartphone 130 (e.g., WWAN, WLAN, Ethernet, and the like).

In one embodiment, the Managed USB VPN Tethering Service is provided in a manner tending to prevent dual connectivity on the smartphone 130 (e.g., where opening VPN access to a generic computer could in theory increase the exposure of the enterprise network to threats associated with dual connectivity, where the computer relays a rogue connection from one of its other network interfaces, from corrupted files residing in the hard disk of the computer, and the like). In one embodiment, for example, in order to prevent dual connectivity, the MA 133 is configured to force all network traffic of the computer 110 through the smartphone 130 when the Managed USB VPN Tethering Service is enabled. In one embodiment, for example, disk scan software, installed in the smartphone 130 and updated independently of computer 110 to which the smartphone 130 attaches, can exclude computers with unsafe software from accessing the enterprise network via the smartphone 130.

In one embodiment, the managed USB service capability is configured to support a Managed USB Smart Card Service.

In general, when compared to a traditional logon procedure based on username and password, a smart card increases the robustness of the user authentication process for remote network access by joining the requirement for "something the user knows" (e.g., username and password, personal identification number, and the like) with the requirement for "something the user has" (i.e., the smart card). The cryptographic certificates stored in the smart card are not necessary only for user logon after the host OS has been loaded, but also at the very beginning of the boot-up procedure to enable its execution. However, smart card authentication for user logon is, by itself, not sufficient to secure a computer, because the computer hard disk can be read by attaching it to another computer. As such, foolproof security requires using smart card authentication not only for booting, but also for full disk encryption.

In one embodiment, the Managed USB Smart Card Service uses the smartphone 130 as a USB Ethernet device and, thus, the smartphone 130 is configured to operate in the USB Ethernet device class, such that smartphone 130 exposes a USB Ethernet interface to the computer 110.

In one embodiment, the Managed USB Smart Card Service configures the smartphone 130 as a smart card with network connectivity, and the user connects the smartphone 130 to the computer 110 via the USB cable in order for the computer 110 to boot up and for the logon procedure to proceed. The Managed USB Smart Card Service also makes the smartphone 130 the repository of the cryptographic keys for encryption of the hard disk of the computer 110 (it is noted that an implementation that complies with smart card standards can interoperate with different full-disk encryption solutions, starting with the pre-boot authentication procedure).

The Managed USB Smart Card Service may be provided using various other configuration options. In one embodiment, for example, the open-source Simple Operating System for Smartcard Education (SOSSE) is used for software implementation of the smart card in the smartphone 130, where the SOSSE code is embedded in the MA 133 of smartphone 130 with the necessary extensions for remote communication with service management system 171 from which the smart card management commands originate. In one embodiment, for example, the computer 110 communicates with the smart card using a TCP connection over the USB Ethernet link, after installation of a dedicated driver. In one embodiment, for example, an ancillary keyboard driver is installed in the computer 110 for key-stroke sequence emulation of smart card insertions and extractions.

The Managed USB Smart Card Service provides a number of advantages over existing smart card implementations. If the computer 110 is stolen but the smart card (i.e., smartphone 130) is not stolen, the hard disk contents of the computer 110 cannot be read from computer 110. If both the computer 110 and the smart card (i.e., smartphone 130) are stolen, the IT administrator can remotely revoke the smart card security information (e.g., the disk encryption keys and the authentication certificates) when the smartphone 130 attaches to a network again, thereby blocking access to the hard disk of the computer 110 even when the thief is in possession of the smart card (i.e., smartphone 130). In this case the hard disk contents of computer 110 are not necessarily lost forever (e.g., because the IT administrator can save the disk encryption keys before remotely revoking them, and can then restore them in the eventuality that the hard disk of computer 110 is recovered). This is true even when the original smartphone 110 is never recovered, because the same keys can be installed in a different smartphone which may then be used as the smart card for computer 110. It is noted that different regulations may apply to duplication and remote storage of cryptographic keys depending on their use (e.g., typically, the duplication of encryption keys is permitted but the duplication of authentication keys is not).

Although primarily depicted and described herein with respect to use of the USB Ethernet class instead of the USB Smart Card class to provide the Managed USB Smart Card Service, it is noted that in one embodiment the Managed USB Smart Card Service may be provided using the USB Smart Card class. However, it is noted that use of the USB Ethernet device class instead of the USB Smart Card device class enables use of the Managed USB Smart Card Service in conjunction with the Managed USB VPN Tethering Service for secure remote access (e.g., for remote enterprise access). Furthermore, the USB Smart Card class only supports card readers, whereas use of the USB Ethernet device class provides enhanced protection for computer 110 by enabling the entire smart card for computer 110 (including encryption keys and certificates) to be instantiated in the smartphone 130, thereby resulting in a smart card that may be controlled remotely by an IT administrator who can install and remove encryption keys and certificates via the network connection 140 supported by smartphone 130.

In one embodiment, the managed USB service capability is configured to support a Managed USB Serial Console Service.

In general, in order to remotely troubleshoot issues on a computer, a technician needs to be able to log into the computer remotely. As a result, if an issue disrupts network connectivity to the computer, the technician cannot troubleshoot the computer remotely. It is noted that many computers and most network equipment (e.g., routers, switches, and the like) support serial-console access, which does not require a functional networking stack and a healthy network infrastructure. In setups for remote serial console access, the serial console is connected to a serial console server, which in turn is accessed remotely through a remote session (e.g., a telnet, an SSH session, and the like). However, these setups are ineffective when the network problems that make the computer or network equipment unreachable also prevent access to the serial console server.

In one embodiment, the Managed USB Serial Console Service uses the smartphone 130 as a USB CDC ACM device and, thus, the smartphone 130 is configured to operate in the USB CDC ACM device class, such that smartphone 130 exposes a USB ACM interface to the computer 110.

The Managed USB Serial Console Service causes the smartphone 130, when connected to the computer 110 through a USB cable, to appear to the computer 110 as a serial console terminal. The Managed USB Serial Console Service, by enabling smartphone 130 to operate as a serial console terminal for computer 110, enables out-of-band access to the serial console independent of the ability of the computer 110 to communicate via a communication network. The USB CDC ACM specifies a USB serial port with full support for all modem control signals. The kernel 135 of smartphone 130 includes a USB Peripheral ACM Modem Subsystem 232$_B$, which implements at least a subset of the USB CDC ACM class. The USB Peripheral ACM Modem Subsystem 232$_B$ can also be configured as a raw serial port, with no modem control signals (it is noted that this mode is sufficient for operation of a serial console for Linux systems, whereas the ACM mode may be needed for serial port access to Microsoft Windows systems).

It is noted that, when the computer 110 runs a Linux or Unix OS, the configuration of some system files (e.g., /etc/inittab), may need to be pre-customized in order to enable the login process over the specified USB serial port. In this case, once the smartphone 130 is configured to be available as a serial console terminal, the IT administrator can log into the console over the remote data connection 172 of the smartphone 130. If the managed USB VPN tethering service is also implemented, the login session is encrypted. The result is an out-of-band secure connection to computer 110 that is always ready for establishment, even at times when regular network connectivity is not available at the computer 110.

It is noted that, since the USB cable also supplies power from the computer 110 to the smartphone 130, the serial console login is possible at all times when the computer 110 is powered on, the smartphone 130 has IP connectivity, and the computer 110 and the smartphone 130 are connected by the USB cable.

It is noted that, while most, if not all, new computers support USB, legacy network equipment tends to support only traditional RS-232 serial ports. However, connection of RS-232 serial ports to the smartphone 130 over USB is difficult, because a serial-to-USB adapter attached to the network equipment exposes a device-side interface over USB (just like smartphone 130) and it is not possible to connect two USB devices together. In one embodiment, use of the Managed USB Serial Console Service with a legacy network device supporting only a traditional RS-232 serial port may be provided by use of a USB Serial Relay configured to support USB CDC ACM applications, where the Serial USB Relay connects the two USB devices, and relays serial port data between the two USB devices. In this case, the USB Serial Relay configured to support USB CDC ACM applications may be provided in any suitable manner (e.g., a background process in a computer and the like).

In one embodiment, the managed USB service capability is configured to support a Managed USB Mass Storage Service.

The smartphone 130, when configured as a USB Mass Storage device, acts as a flash disk drive attached to the computer 110.

In one embodiment, the Managed USB Mass Storage Service uses the smartphone 130 as a USB Mass Storage device and, thus, the smartphone 130 is configured to operate in the USB Mass Storage device class, such that smartphone 130 exposes a USB Mass Storage interface to the computer 110.

In one embodiment, the Managed USB Mass Storage Service is provided by creating a partition on the SD card of the smartphone 130, and mapping the partition on the SD card of the smartphone 130 to the USB Mass Storage device on the smartphone 130. In one such embodiment, MA 133 of smartphone 130 is configured to move data files in both directions between the mapped partition on the smartphone 130 and one or more enterprise servers of the enterprise network (e.g., via interface 138 and via network module 137). As a result, the smartphone 130 appears to the computer 110 as a virtual network device in the enterprise network, such that data may be exchanged between the enterprise network and the computer 110 via the smartphone 130. For example, data may be transferred from the enterprise network to smartphone 130 via the remote data connection 172, and then transferred from smartphone 130 to computer 110 via peripheral connection 120. Similarly, for example, data may be transferred from computer 110 to smartphone 130 via peripheral connection 120, and then transferred from smartphone 130 to the enterprise network via the remote data connection 172. It will be appreciated that the transferred data may include any suitable types of data. For example, transferred data may include security data that enterprise IT administrators wish to provide from enterprise network to computer 110 (e.g., software patches, drive backups, and the like), user data that the user of computer 110 wishes to send from computer 110 to the enterprise network, and the like.

In at least some embodiments, the Managed USB Mass Storage Service uses enhanced data transfer primitives for data exchanges between the computer 110 and the enterprise server of the enterprise network, such that the data exchanges (which normally require direct IP connectivity between the two endpoints) can be staged in two time-shifted steps as follows: (1) in a first step, the computer 110 and the smartphone 130 exchange the content irrespective of the availability of Internet connectivity, and (2) in the second step, the smartphone 130 and the enterprise server exchange the content whether or not the computer 110 is powered on or attached to the smartphone 130. In this manner, the IT organization of the enterprise can use the mapped partition on the smartphone 130 in order to push/pull content to/from computer 110, even at times when the computer 110 is not powered on or connected to the smartphone 130.

In one embodiment, the managed USB service capability is configured to support a Managed USB Booting Service.

In one embodiment, the Managed USB Booting Service uses the smartphone 130 as a USB Mass Storage device and, thus, the smartphone 130 is configured to operate in the USB Mass Storage device class.

The Managed USB Booting Service enables the smartphone 130 to be used not merely as a generic USB flash drive (as is the case when the Managed USB Mass Storage Service is used), but, rather, as a more specific bootable USB flash disk drive in order to providing booting of computer 110 from the smartphone 130 via peripheral interface 120. As described in conjunction with the Managed USB Mass Storage Service, the Managed USB Mass Storage Service is provided by creating a partition on the SD card of the smartphone 130, and mapping the partition on the SD card of the smartphone 130 to the USB Mass Storage device on the smartphone 130. The Managed USB Booting Service may then be provided by formatting the mapped partition on the smartphone 130 with a bootable boot sector and loading the mapped partition on the smartphone 130 with OS files, thereby enabling use of the smartphone 130 (configured as a USB Mass Storage device) not just as a regular USB flash drive, but as a bootable USB flash drive. In at least one embodiment, it is expected that computer 110 supports booting from a USB device (most computers support such a capability), and that the smartphone 130 supports strict USB timing (because the computer BIOS of the computer 110, which drives the booting process, is adversely sensitive to delays and jitters which are not uncommon in software implementations of some smartphone USB peripherals).

In one embodiment, use of the smartphone 130 as a bootable USB flash drive for booting computer 110 is performed by enabling the computer to retrieve booting code from the smartphone 130. In one embodiment, for example, the booting code follows the following path as the computer BIOS of computer 110 retrieves the booting code from the SD card of the smartphone 130 (where some elements of the path are not depicted in FIG. 1 or 2): flash storage of smartphone 130 (which includes the Bootable Sector, Boot Loader, OS Files, and Generic Storage)←→Disk Subsystem of smartphone 130←→USB module 136 of smartphone 130←→peripheral connection 120 (i.e., USB cable) ←→USB Host Controller 215 of computer 110←→BIOS USB Mass Storage Driver of computer 110←→Boot Option Selector of computer 110←→BIOS of computer 110. It is noted that, within the Disk Subsystem of smartphone 130, the path includes: Block Device Driver (Flash) Block Device Virtualization Layer←→File System (e.g., JFFS2) ←→Disk Cache←→File System Virtualization Layer (e.g., VFS).

In one embodiment, following booting of the computer 110 using the smartphone 130 as a bootable USB flash drive, the computer 110 then has application access to the smartphone for performing various functions. In one embodiment, for example, the data path for application access to the SD card of the smartphone 130, after the computer 110 has finished loading the OS, is as follows (where some elements of the path are not depicted in FIG. 1 or 2): Generic Program in user space 111 of computer 110←→Disk Subsystem of computer 110←→USB module 116 of computer 110←→peripheral connection 120 (i.e., USB cable) ←→USB module 136 of smartphone 130←→Disk Subsystem of smartphone 130←→flash storage of smartphone 130 (which includes the Bootable Sector, Boot Loader, OS Files, and Generic Storage). It is noted that, within the Disk Subsystem of computer 110, the path includes: File System Virtualization Layer (e.g., VFS)←→Disk Cache←→File System (e.g., Ext3)←→Block Device Virtualization Layer-←→Block Device Driver Selector←→Block Device Driver (vSCSI). It is further noted that, within the Disk Subsystem of smartphone 130, the path includes: File System Virtualization Layer (e.g., VFS)←→Disk Cache←→File System (e.g., JFFS2)←→Block Device Virtualization Layer-←→Block Device Driver (Flash).

In one embodiment, the Managed USB Booting Service enables a customized OS to be loaded onto computer 110 from the mapped partition on smartphone 130. The customized OS may be customized for any suitable functions. In one embodiment, for example, the customized OS may be customized to include various diagnostic features that provide the user with a powerful tool for dealing with various problems on computer 110 (e.g., problems such as corrupted or failing hard disk drives, virus infections, damaged operating systems, and the like, as well as various combinations thereof).

In one embodiment, following use of the Managed USB Booting Service to boot computer 110 via smartphone 130, the Managed USB VPN Tethering Service may be used such that the booted computer 110 can automatically establish a secure connection to a secure network (e.g., a VPN connection to an enterprise network). The secure connection may be used to provide a remote administrator with a login interface to computer 110, thereby providing the remote administrator with real-time access to all of the software components of computer 110.

In one embodiment, in which the smartphone 130 supports concurrent use of multiple USB device classes, the smartphone 130 can use the USB Mass Storage device class to support the Managed USB Booting Service and may simultaneously use the USB CDC device class to support the Managed USB VPN Tethering Service.

In one embodiment, in which the smartphone 130 does not support concurrent use of multiple USB device classes (i.e., the USB Mass Storage device class used to support the Managed USB Booting Service cannot coexist with the USB CDC device used to support the Managed USB VPN Tethering Service), a networking capability may be used to overcome this limitation by establishing a point-to-point IP connection between the computer 110 and the smartphone 130, even after the smartphone 130 has been set to operate as a USB Mass Storage Class device. In one embodiment, the networking capability that is used is an IP Over Storage (IPOST) networking capability.

In general, the IPOST networking capability enables transfer of packets between a pair of devices. In order to transfer IP packets between two devices, the IPOST networking capability uses a pair of packet queues (one per traffic direction), implemented in a shared-storage file system which is exposed by one of the devices to the other of the devices, where both of the devices may execute packet transmissions and packet receptions as write operations and read operations into and out of the two storage queues, respectively. An exemplary embodiment of the IPOST networking capability is depicted and described with respect to FIG. 5.

Figure 5:
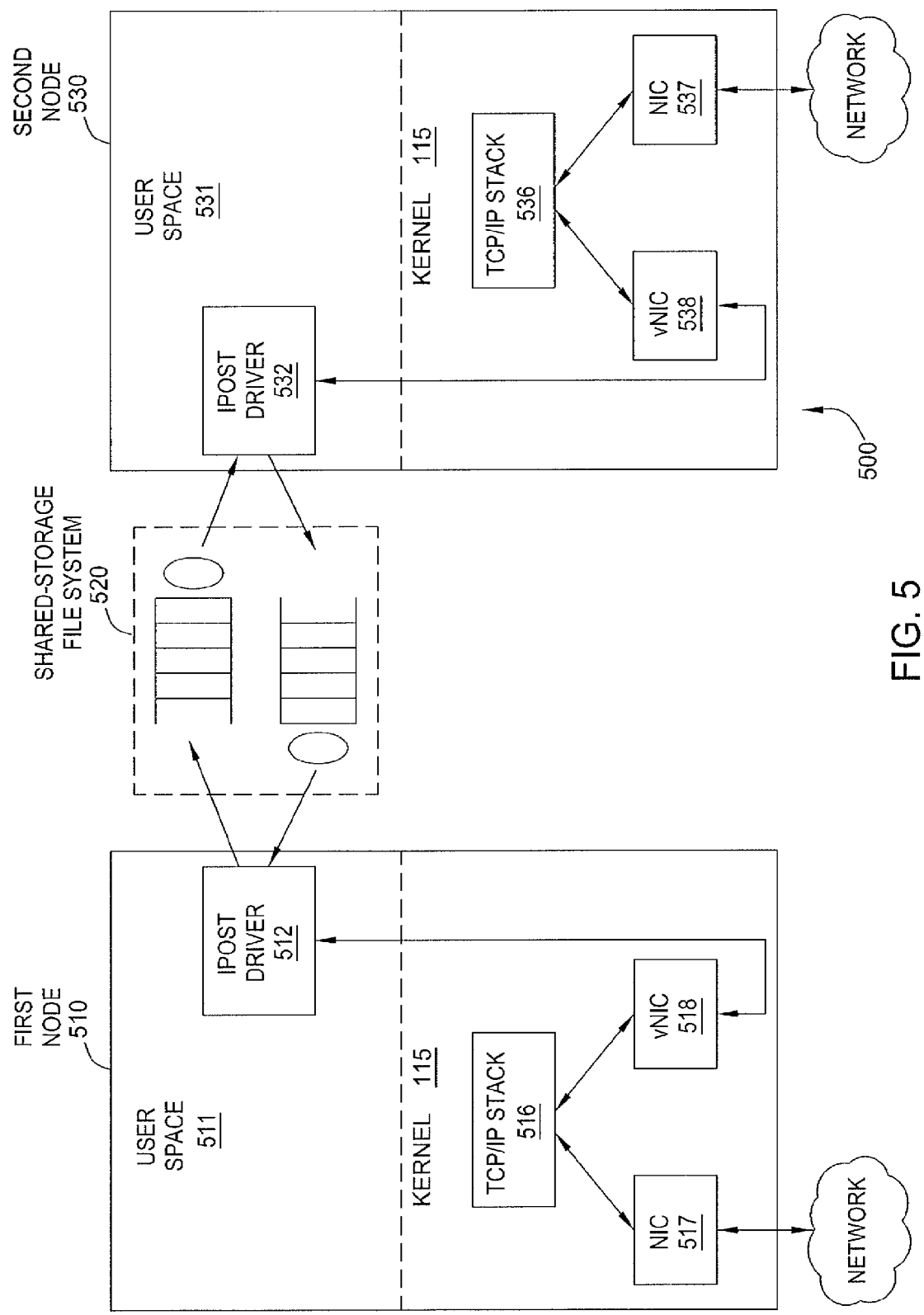
FIG. 5 depicts one embodiment of an IPOST networking capability for supporting transfer of IP packets between devices.

FIG. 5 depicts one embodiment of an IPOST networking capability for supporting transfer of IP packets between devices.

As depicted in FIG. 5, the IPOST networking capability is configured to support communication of IP packets between a first node 510 and a second node 530 via a shared-storage file system 520.

The first node 510 includes a user space 511 and a kernel 515. The user space 511 includes an IPOST driver 512. The kernel 515 includes a TCP/IP stack 516, a Network Interface Card (NIC) 517, and a virtual NIC (vNIC) 518.

The IPOST driver 512 runs in the first node 510 as a user-space process interfaced with TCP/IP stack 516 (via vNIC 518) and shared-storage file system 520. The IPOST driver 512 interfaces with TCP/IP stack 516 such that it has access to IP packets. With respect to the interface of the IPOST driver 512 to the shared-storage file system 520, it is noted that the IPOST driver 512 includes one or more functional components configured to handle one or more of file and disk caching, absence of locking or synchronization primitives for shared storage, atomic updates of shared data structures, selection of a suitable read and write size, absence of receive notifications, potentially dissimilar byte ordering at the two ends, and the like, as well as various combinations thereof. Although primarily depicted and described with respect to implementation of the IPOST driver 512 within the user space 511, it is noted that the IPOST driver also may be implemented within kernel 515 (i.e., choice of user-space placement is driven by convenience considerations, not by hard constraints).

The NIC 517 interfaces with TCP/IP stack 516, and also supports an external communication interface to an associated communication network. The NIC 517 may be implemented as any suitable type of network interface (e.g., Ethernet, WiFi, and the like).

The vNIC 518 interfaces with TCP/IP stack 516, and also supports an internal communication interface to IPOST driver 512. The vNIC 518 may be implemented in any suitable manner. In one embodiment, vNIC 518 is implemented as a point-to-point IP interface (although other implementations may be used, such as implementation as an Ethernet-like broadcast multi-access interface or any other suitable type of interface). In one embodiment, instantiation of the vNIC 518 is provided using a standard network tunnel/tap (TUN/TAP) driver configured in TUN mode for exposing raw IP packets to the IPOST driver 512.

The second node 530 includes a user space 531 and a kernel 535. The user space 531 includes an IPOST driver 532. The kernel 535 includes a TCP/IP stack 536, a Network Interface Card (NIC) 537, and a virtual NIC (vNIC) 538.

The configuration and operation of second node 530 is identical (or at least substantially similar) to the configuration and operation of first node 510.

The IPOST interface with shared-storage file system 520 includes a pair of shared circular packet queues $521_1$ and $521_2$ (collectively, circular packet queues 521). In order to ensure lock-free, synchronized operation of the shared-queue data structures of shared-storage file system 520, the read/write operations maintain properties of being atomic and in-order. The atomic property implies that a read operation out of a shared storage area never yields the intermediate value of a concurrent write operation into the same area (i.e., the value returned by the read operation is either the one stored in the shared area prior to the concurrent write operation, or the final result of the write operation). The in-order execution property ensures that the pointer and content updates resulting from a packet write operation are always exposed to the reading end simultaneously. The shared-storage file system 520 satisfies both properties at the sector level, consistent with disk access standards for most computer systems.

The shared-storage file system 520 is implemented such that each of the two nodes (i.e., first node 510 and second node 530) sees each queue 521 of shared-storage file system 520 as a distinct partition.

The queues 521 are circular for prevention of indefinite growth, on space that is allocated beforehand to avoid run-time starvation issues. The first node 510 acts as the writer for one queue 521 and as the reader for the other queue 521 and, similarly, the second node 530 acts as the writer for one queue 521 and as the reader for the other queue 521.

The queues 521 are each composed of a fixed number of queue elements, each element being composed of a fixed number of sectors. For example, assuming a standard maximum transmission unit (MTU) of 1500 bytes and a sector size of 512 bytes, a three-sector queue element gives enough space to store both the packet and some auxiliary packet information (e.g., packet size, timestamp, priority, and the like, as well as various combinations thereof). It is noted that, in at least some cases (e.g., when implementing a point-to-point network interface), the MTU size may be configured to any suitable value and, similarly, that the number of sectors per queue element may be set in accordance with the configured MTU size. It is further noted that the MTU size and/or the number of queue elements of queues 521 may be different for the two queues 521 (although, for each queue 521, the configuration information must be consistent at both ends).

The queues 521 are configured to remain synchronized in order to maintain proper operation. In one embodiment, in order for the two ends of each queue 521 to remain synchronized, they may share queue usage information, so that the reader knows when a new queue element is available for reading and the writer knows when a queue element has been read and is again available for writing. In one embodiment, for example, the shared information for each queue 521 includes a read counter and a write counter, where the writer increments the write counter each time it inserts a packet into the queue 521 and the reader increments the read counter each time it retrieves a packet from the queue 521. Given that, for each queue 521, the packets are inserted in modulo order in the circular queue 521, the read and write counters are sufficient for each end to know how many queue elements are free in the queue 521, how queue elements are in use in the queue 521, and where the current read and write pointers are located within the queue 521. In one embodiment, in each queue 521, the first sector of the queue 521 stores the read/write counters and acts as a control element for the queue, and the subsequent sectors store the data elements (e.g., IP packets). In one embodiment, for the queues 521, the control element of one of the queues 521 includes (a) the write counter maintained by the writer and (b) the read counter that the same writer maintains for the other one of the queue 521 where it acts as the reader; and vice versa. It is noted, for each queue 521, this results in an arrangement in which one end has only write access to the sectors of the queue 521 (for both data and control elements), while the other end has only has read access to the sectors of the queue 521 (for both data and control elements). This prevents conflicts between the two ends for write access to the same control element.

The IPOST networking capability (e.g., such as in the embodiment depicted and described with respect to FIG. 5) has various applications, one of which is to enable a device to perform networking functions when the device is already operating as a USB Mass Storage device (e.g., enabling smartphone 130 to perform networking functions when smartphone 130 is already in operation as a USB Mass Storage device).

The IPOST networking capability, when implemented in the file system of a USB Mass Storage device, presents two major issues when the physical medium that supports the file system is a flash memory (as in the case where the IPOST networking capability is used by smartphone 130 when providing managed USB services). First, writing into a flash memory is generally a relatively slow operation. Second, flash storage is generally not designed for a large number of writes, and even when wear-leveling technologies are adopted frequent writing to a flash file system will usually cause the flash file system to fail prematurely. In one embodiment of the IPOST networking capability, these issues are solved by exporting three storage partitions from the USB Mass Storage device as follows: (1) a first partition, residing in the flash memory of smartphone 130, which includes the software that the computer 110 needs to run in order to use the IPOST vNIC (e.g., the boot image), and (2) a second partition and a third partition, residing in the RAM of smartphone 130, which accommodate the IPOST shared queues 521. The smartphone 130 is capable of exporting multiple storage entities over a single USB Mass Storage interface, because USB Mass Storage works on a Small Computer System Interface (SCSI) emulation where (a) USB acts as a transport medium for SCSI commands between the host and the target device, and (b) SCSI supports multiple logical unit numbers (LUNs) or logical volumes in a single target (a feature of SCSI which may be used to expose multiple disks over USB). In the case of the Managed USB Booting Service where the computer 110 boots from the USB Mass Storage Device of smartphone 130, the BIOS of computer 130 only sees the LUN of the first partition and boots from it. Then, once the OS is loaded in computer 110, the computer 110 recognizes the entire set of LUNs, thereby providing the IPOST driver 512 with access to the two RAM disks on the smartphone 130 as local volumes.

It is noted that, in at least one embodiment, RAM disks may be preferred over RAM-based file systems (e.g., such as tmpfs and ramfs), because the RAM-based file systems have associated overhead that is not used by the IPOST networking capability (e.g., IPOST only needs read and write access to sectors). While RAM space in smartphones is typically not abundant (e.g., typically between 128 Mb and 512 MB), the RAM requirements for implementation of the IPOST networking capability are relatively modest. In the case of a 1.5 KB MTU, for example, a queue with 64 data elements (of three sectors each) and one control element consumes a total of 193 sectors, or about 97 KB at 512 bytes per sector, resulting in a very marginal load on a typical smartphone. In the case of a 9 KB MTU, for example, the total memory required by the two queues amounts to 1153 KB, still below 1% of the minimum RAM space available on a typical smartphone.

It is noted that throughput and latency performance of the IPOST networking capability, between a laptop and a smartphone configured as a USB Mass Storage device, with MTU sizes of 1.5 KB and 9 KB may be evaluated using iperf and ping tests. During at least one test, it was noted that while the measured ping latency was the same (e.g., 45 ms) for both MTU sizes, the throughput grew (e.g., from 1.3 Mbps to 7.5 Mbps) as the MTU size became larger. The results were identical in the two directions. The measurements show that the throughput is constrained by the frequency of the memory accesses (higher with smaller MTU sizes), that even the smaller MTU size guarantees transfer rates above the typical capacity of current WWLAN connections, and that much higher throughput can be achieved without tangible impact on the available RAM space.

It is noted that the IPOST networking capability providing the IPOST logical link over a USB medium, when compared to a more canonical WiFi or Bluetooth connection, offers various advantages. The IPOST networking capability does not require explicit setup of the direct connection between the computer 110 and the smartphone 130, or hunting for a WiFi hotspot to work as a relay. The IPOST networking capability does not have any associated eavesdropping or power issues.

As described herein, the IPOST networking capability has various applications. Thus, although primarily depicted and described herein with respect to use of the IPOST networking capability to enable a device to perform networking functions when the device is already operating as a USB Mass Storage device, the IPOST networking capability also may be used for various other applications. In one embodiment, for example, the IPOST networking capability is used to provide connectivity across network address translation (NAT) and firewall boundaries. In one embodiment, for example, the IPOST networking capability is used for establishment of covert communications channels. The IPOST networking capability may be used in various other applications.

Although primarily depicted and described herein within the context of a USB-based implementation of the managed USB service capability (e.g., using a USB peripheral connection, USB device classes, and the like), it is noted that various embodiments of the managed USB service capability may be provided using one or more other types of technologies (e.g., using other types of peripheral connections supported using other types of peripheral connection device classes). Similarly, although primarily depicted and described herein within the context of a USB-based implementation of the managed USB service capability, it is noted that various other similar capabilities may be provided using one or more other types of technologies (e.g., using other types of peripheral connections supported using other types of peripheral connection device classes). As such, it is noted that various USB-specific terms used herein may be read more generally. For example, references herein to a USB-based peripheral connection may be read more generally as being a peripheral connection (e.g., a WiFi peripheral connection, a Bluetooth peripheral connection, or any other suitable type of peripheral connection or other connection). For example, references herein to USB device classes may be read more generally as being peripheral connection device classes suitable for supporting any type of peripheral connection which may be used to connect the computer and the mobile computing device (e.g., a WiFi peripheral connection, a Bluetooth peripheral connection, or any other suitable type of peripheral connection or other connection). For example, references herein to USB-specific subsystems and modules (e.g., a USB peripheral Mass Storage subsystem, a USB peripheral ACM Modem subsystem, a USB peripheral Ethernet subsystem, a USB interface selector, a USB Peripheral Controller Driver, a USB Peripheral Controller, and the like) may be read more generally (e.g., as a peripheral mass storage subsystem, a peripheral serial port subsystem, a peripheral network connection subsystem, a peripheral interface selector, a Peripheral Controller Driver, a Peripheral Controller, and the like).

Figure 6:
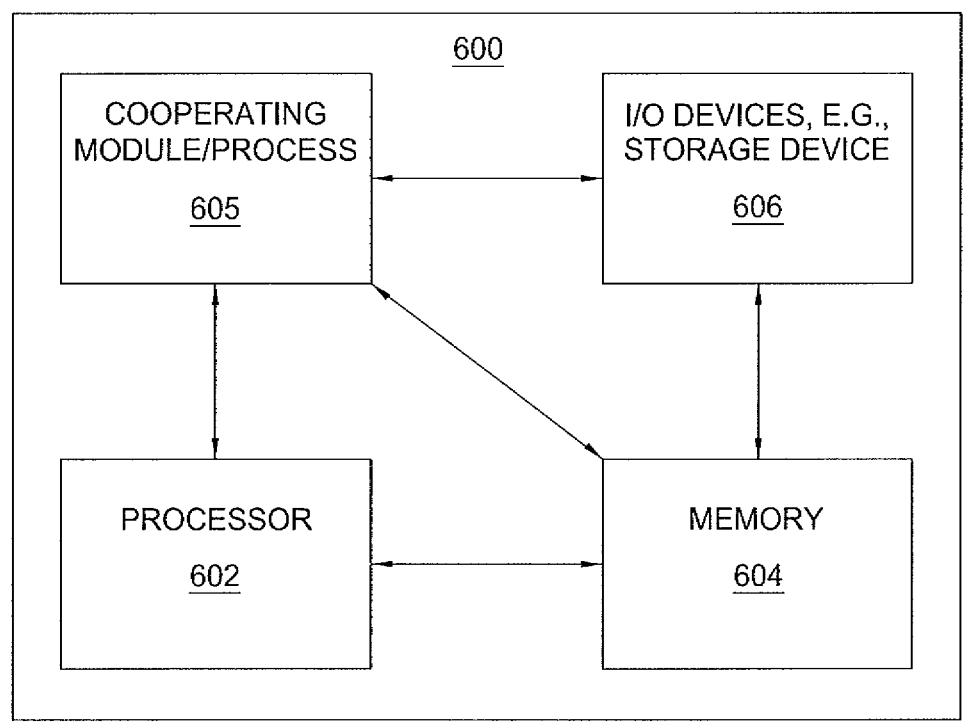
FIG. 6 depicts a high-level block diagram of a computer suitable for use in performing the functions described herein.

FIG. 6 depicts a high-level block diagram of a computer suitable for use in performing functions described herein.

As depicted in FIG. 6, computer 600 includes a processor element 602 (e.g., a central processing unit (CPU) and/or other suitable processor(s)) and a memory 604 (e.g., random access memory (RAM), read only memory (ROM), and the like). The computer 600 also may include a cooperating module/process 605 and/or various input/output devices 606 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software (e.g., via implementation of software on one or more processors) and/or hardware (e.g., using a general purpose computer, one or more application specific integrated circuits (ASIC), and/or any other hardware equivalents).

It will be appreciated that the functions depicted and described herein may be implemented in software for executing on a general purpose computer (e.g., via execution by one or more processors) so as to implement a special purpose computer, and/or may be implemented in hardware (e.g., using one or more application specific integrated circuits (ASIC) and/or one or more other hardware equivalents).

In one embodiment, the cooperating process 605 can be loaded into memory 604 and executed by processor 602 to implement functions as discussed herein. Thus, cooperating process 605 (including associated data structures) can be stored on a computer readable storage medium, e.g., RAM memory, magnetic or optical drive or diskette, and the like.

It will be appreciated that computer 600 depicted in FIG. 6 provides a general architecture and functionality suitable for implementing functional elements described herein and/or portions of functional elements described herein. For example, the computer 600 provides a general architecture and functionality suitable for implementing one or more of computer 110, one or more modules of computer 110, smartphone 130, one or more modules of smartphone 130, service management system 171, one or more modules of service management system 171, an administrator terminal 175, one or more modules of administrator terminal 175, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A mobile computing device, comprising:
a processor and a memory communicatively connected to the processor, the processor configured to:
receive, at the mobile computing device via a wireless interface of the mobile computing device from a remote network server via a network connection between the mobile computing device and the remote network server, a request to configure the mobile computing device to operate in a selected peripheral connection device class of a plurality of peripheral connection device classes;
configure the mobile computing device to operate in the selected peripheral connection device class;
receive, at the mobile computing device from the remote network server via the network connection, information associated with a service to be provided for a host computer by the mobile computing device based on the selected peripheral connection device class; and
communicate with the host computer, via a peripheral connection interface of the mobile computing device configured to support a peripheral connection between the mobile computing device and the host computer, based on the service to be provided for the host computer by the mobile computing device based on the selected peripheral connection device class.

2. The mobile computing device of claim 1, further comprising:
a storage subsystem and an associated peripheral mass storage subsystem;
a serial port subsystem and an associated peripheral serial port subsystem; and
a networking subsystem and an associated peripheral network connection subsystem.

3. The mobile computing device of claim 2, further comprising:
a peripheral interface selector configured to select one of a plurality of peripheral subsystems of the mobile computing device;
a Peripheral Controller Driver configured to communicate with the peripheral interface selector; and
a Peripheral Controller configured to communicate with the Peripheral Controller Driver.

4. The mobile computing device of claim 1, wherein the plurality of peripheral connection device classes comprise a plurality of Universal Serial Bus (USB) device classes.

5. The mobile computing device of claim 4, wherein the plurality of USB device classes comprise at least one of a USB Mass Storage device class, a USB ACM Modem device class, and a USB Ethernet device class.

6. The mobile computing device of claim 4, further comprising:
a storage subsystem and an associated USB peripheral Mass Storage subsystem;
a serial port subsystem and an associated USB peripheral ACM Modem subsystem; and
a networking subsystem and an associated USB peripheral Ethernet subsystem.

7. The mobile computing device of claim 4, further comprising:
a USB interface selector configured to select one of a plurality of USB peripheral subsystems of the mobile computing device;
a USB Peripheral Controller Driver configured to communicate with the USB interface selector; and
a USB Peripheral Controller configured to communicate with the USB Peripheral Controller Driver.

8. The mobile computing device of claim 1, wherein the processor is configured to provide a management agent, wherein the management agent is configured to:
receive the request to configure the mobile computing device to operate in the selected peripheral connection device class; and
initiate configuration of the mobile computing device to operate in the selected peripheral connection device class.

9. The mobile computing device of claim 8, further comprising:
an interface selector configured to select a peripheral connection subsystem associated with the selected peripheral connection device class;
wherein the management agent is configured to propagate a command to the interface selector for triggering the interface selector to select the peripheral connection subsystem associated with the selected peripheral connection device class.

10. The mobile computing device of claim 8, wherein the processor is configured to provide a user agent, wherein the user agent is configured to provide a Graphical User Interface (GUI) for receiving local control information, wherein the user agent is further configured to provide the local control information to the management agent.

11. The mobile computing device of claim 1, wherein the wireless interface comprises a cellular interface.

12. The mobile computing device of claim 1, wherein the information associated with the service to be provided for the host computer by the mobile computing device based on the selected peripheral connection device class comprises a set of operating system (OS) files, wherein the processor is configured to:
create a partition on a memory card of the mobile computing device;
map the partition to a USB Mass Storage device on the mobile computing device;
format the mapped partition on the mobile computing device to include a bootable boot sector; and
load the OS files into the mapped partition on the mobile computing device.

13. The mobile computing device of claim 12, wherein, to communicate with the host computer based on the service to be provided for the host computer by the mobile computing device based on the selected peripheral connection device class, the processor is configured to:
provide the OS files toward the host computer via the peripheral connection between the mobile computing device and the host computer.

14. The mobile computing device of claim 1, wherein the information associated with the service to be provided for the host computer by the mobile computing device based on the selected peripheral connection device class comprises smart card security information configured for using the mobile computing device as a smart card for the host computer, wherein the processor is configured to:
configure the mobile computing device as a smart card with network connectivity via the network connection; and
store, on the mobile computing device, the smart card security information configured for using the mobile computing device as a smart card for the host computer.

15. The mobile computing device of claim 14, wherein the smart card security information comprises at least one of authentication certificates or cryptographic keys for encryption of a hard disk of the host computer.

16. The mobile computing device of claim 14, wherein, to communicate with the host computer based on the service to be provided for the host computer by the mobile computing device based on the selected peripheral connection device class, the processor is configured to communicate with the host computer using a Transmission Control Protocol (TCP) connection running over a USB Ethernet link between the mobile computing device and the host computer.

17. The mobile computing device of claim 14, wherein the processor is configured to:
receive, at the mobile computing device from the remote network server via the network connection, a command configured to revoke the smart card security information configured for using the mobile computing device as a smart card for the host computer.

18. The mobile computing device of claim 1, wherein the processor is configured to:
configure the mobile computing device to operate as a serial console terminal for the host computer;
receive, at the mobile computing device via the network connection, a login request for login to the host computer; and
propagate the login request from the mobile computing device toward the host computer via the peripheral connection between the mobile computing device and the host computer.

19. An apparatus, comprising:
a processor and a memory communicatively connected to the processor, the processor configured to:
receive, at a mobile computing device via a wireless interface of the mobile computing device from a remote network server via a network connection between the mobile computing device and the remote network server, a message associated with a service to be provided for a host computer via the mobile computing device; and
initiate, at the mobile computing device based on a peripheral connection device class of the mobile computing device, an action for providing the service for the host computer via the mobile computing device based on the peripheral connection device class of the mobile computing device.

20. The apparatus of claim 19, wherein the service comprises at least one of a Managed USB Internet Tethering Service, a Managed USB VPN Tethering Service, a Managed USB Smart Card Service, a Managed USB Serial Console Service, a Managed USB Mass Storage Service, and a Managed USB Booting Service.

21. The apparatus of claim 19, wherein the message comprises a request to provide the service.

22. The apparatus of claim 19, wherein initiating an action for providing the service for the host computer via the mobile computing device comprises:
configuring the mobile computing device to operate in at least one of a USB Ethernet device class, a USB CDC Abstract Control Model (ACM) device class, and a USB Mass Storage device class.

23. The apparatus of claim 19, wherein initiating an action for providing the service for the host computer via the mobile computing device comprises:
configuring the mobile computing device to operate as a router having a Network Address Translation (NAT) capability and a Dynamic Host Control Protocol (DHCP) server capability.

24. The apparatus of claim 23, wherein the processor is further configured to:
receive, at the mobile computing device, information from the host computer, wherein the information is received via the peripheral connection between the mobile computing device and the host computer; and
propagate the information via the network connection between the mobile computing device and the remote network server.

25. The apparatus of claim 19, wherein initiating an action for providing the service for the host computer via the mobile computing device comprises:
initiating establishment of a secure connection between the mobile computing device and a secure server of a private network;
receiving, at the mobile computing device from the secure server, an Internet Protocol (IP) address for the host computer; and
propagating the IP address for the host computer toward the host computer via the peripheral connection between the mobile computing device and the host computer.

26. The apparatus of claim 25, wherein the processor is further configured to:
configure the mobile computing device to operate as a default router for the host computer;
receive, at the mobile computing device, traffic from the host computer that is intended for the private network; and
propagate the received traffic toward the private network via the secure connection between the mobile computing device and the secure server of the private network.

27. The apparatus of claim 19, wherein initiating an action for providing the service for the host computer via the mobile computing device comprises:
configuring the mobile computing device as a smart card with network connectivity via the network connection; and
storing, on the mobile computing device, smart card security information configured for using the mobile computing device as a smart card for the host computer.

28. The apparatus of claim 27, wherein the processor is further configured to:
receive, at the mobile computing device from the host computer, information intended for the remote network server, wherein the information is received via a Transmission Control Protocol (TCP) connection running over a USB Ethernet link between the host computer and the mobile computing device; and
propagate the information toward the remote network server via the network connection.

29. The apparatus of claim 27, wherein the processor is further configured to:
receive, at the mobile computing device from the remote network server, a command configured to revoke smart card security information stored on the mobile computing device for the host computer.

30. The apparatus of claim 19, wherein initiating an action for providing the service for the host computer via the mobile computing device comprises:
configuring the mobile computing device to operate as a serial console terminal for the host computer;
receiving, at the mobile computing device via the network connection, a login request for login to the host computer; and
propagating the login request from the mobile computing device toward the host computer via the peripheral connection between the mobile computing device and the host computer.

31. The apparatus of claim 19, wherein initiating an action for providing the service for the host computer via the mobile computing device comprises:
creating a partition on a memory card of the mobile computing device; and
mapping the partition to a USB Mass Storage device on the mobile computing device.

32. The apparatus of claim 31, wherein the processor is configured to:
receive a data file at the mobile computing device from the host computer, wherein the data file is received via the peripheral connection between the host computer and the mobile computing device;
store the received data file in the mapped partition on the mobile computing device; and
propagate the data file from the mapped partition on the mobile computing device toward the remote network server via the network connection.

33. The apparatus of claim 31, wherein the processor is configured to:
receive a data file at the mobile computing device from the remote network server, wherein the data file is received via the network connection;
store the received data file in the mapped partition on the mobile computing device; and
propagate the data file from the mapped partition on the mobile computing device toward the host computer via the peripheral connection between the mobile computing device and the host computer.

34. The apparatus of claim 19, wherein initiating an action for providing the service for the host computer via the mobile computing device comprises:
creating a partition on a memory card of the mobile computing device;
mapping the partition to a USB Mass Storage device on the mobile computing device;
formatting the mapped partition on the mobile computing device to include a bootable boot sector; and
loading Operating System (OS) files into the mapped partition.

* * * * *